US012130580B2

(12) United States Patent
Sato

(10) Patent No.: US 12,130,580 B2
(45) Date of Patent: Oct. 29, 2024

(54) IMAGE FORMING APPARATUS

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/340,172

(22) Filed: Jun. 23, 2023

(65) Prior Publication Data

US 2023/0333508 A1 Oct. 19, 2023

Related U.S. Application Data

(63) Continuation of application No. 17/868,843, filed on Jul. 20, 2022, now Pat. No. 11,709,454, which is a (Continued)

(30) Foreign Application Priority Data

Feb. 6, 2015 (JP) ................................ 2015-022597

(51) Int. Cl.
*G03G 21/16* (2006.01)
*G03G 21/18* (2006.01)

(52) U.S. Cl.
CPC ..... *G03G 21/1803* (2013.01); *G03G 21/1623* (2013.01); *G03G 21/1842* (2013.01); (Continued)

(58) Field of Classification Search
CPC ........... G03G 21/1623; G03G 21/1803; G03G 21/1842
(Continued)

(56) References Cited

U.S. PATENT DOCUMENTS 5,065,197 A 11/1991 Mitsuyama
5,225,881 A 7/1993 Goto et al.
(Continued)

FOREIGN PATENT DOCUMENTS

JP H09-304994 A 11/1997
JP H10-245145 A 9/1998
(Continued)

OTHER PUBLICATIONS

Feb. 5, 2016—Co-pending U.S. Appl. No. 15/016,581.
(Continued)

*Primary Examiner* — Hoan H Tran
(74) *Attorney, Agent, or Firm* — Merchant & Gould P.C.

(57) ABSTRACT

An image forming apparatus includes a body casing, a pressing member, a process cartridge, and a drawer. The body casing includes a positioning member. The pressing member is disposed inside the body casing. The process cartridge includes a photosensitive drum. The drawer is configured to support the process cartridge and to move, in a sliding direction orthogonal to an axis direction of the photosensitive drum, between an inside position that is a position inside the body casing and an outside position that is a position outside the body casing. The process cartridge includes an engagement portion and a spring. The engagement portion is configured to be positioned by the positioning member. The spring is configured to be pressed by the pressing member such that the engagement portion is pressed toward the positioning member.

17 Claims, 12 Drawing Sheets

Related U.S. Application Data continuation of application No. 17/066,574, filed on Oct. 9, 2020, now Pat. No. 11,397,404, which is a continuation of application No. 16/785,736, filed on Feb. 10, 2020, now Pat. No. 10,802,438, which is a continuation of application No. 16/358,834, filed on Mar. 20, 2019, now Pat. No. 10,558,164, which is a continuation of application No. 16/012,970, filed on Jun. 20, 2018, now Pat. No. 10,241,466, which is a continuation of application No. 15/379,654, filed on Dec. 15, 2016, now Pat. No. 10,007,230, which is a continuation of application No. 15/014,137, filed on Feb. 3, 2016, now Pat. No. 9,529,321.

(52) U.S. Cl.
CPC . *G03G 21/1853* (2013.01); *G03G 2221/1684* (2013.01); *G03G 2221/1869* (2013.01)

(58) Field of Classification Search
USPC .......................................... 399/107, 110, 111
See application file for complete search history.

(56) References Cited

U.S. PATENT DOCUMENTS

| | | | |
|---|---|---|---|
| 7,395,008 | B2 | 7/2008 | Sato et al. |
| 7,426,355 | B2 | 9/2008 | Okabe |
| 7,457,566 | B2 | 11/2008 | Koishi et al. |
| 7,486,907 | B2 | 2/2009 | Noguchi et al. |
| 7,660,549 | B2 | 2/2010 | Noguchi et al. |
| 7,664,428 | B2 | 2/2010 | Kei |
| 7,684,728 | B2 | 3/2010 | Okabe et al. |
| 8,145,095 | B2 | 3/2012 | Sakurai et al. |
| 8,358,952 | B2 | 1/2013 | Okabe |
| 8,369,743 | B2 | 2/2013 | Maeshima et al. |
| 8,447,208 | B2 | 5/2013 | Fujita et al. |
| 8,452,208 | B2 | 5/2013 | Kikuchi |
| 8,463,156 | B2 | 6/2013 | Akutsu et al. |
| 8,526,848 | B2 | 9/2013 | Nishiuwatoko et al. |
| 8,587,660 | B2 | 11/2013 | Mitra et al. |
| 8,606,143 | B2 | 12/2013 | Kikuchi |
| 8,755,718 | B2 | 6/2014 | Ushiozu et al. |
| 8,768,206 | B2 | 7/2014 | Sato |
| 8,792,805 | B2 | 7/2014 | Takayama |
| 8,855,518 | B2 | 10/2014 | Eom |
| 8,855,530 | B2 | 10/2014 | Sato |
| 8,855,531 | B2 | 10/2014 | Suzuki et al. |
| 8,862,022 | B2 | 10/2014 | Sato et al. |
| 8,892,002 | B2 | 11/2014 | Sato |
| 8,929,770 | B2 | 1/2015 | Sato |
| 9,037,036 | B2 | 5/2015 | Yamashita et al. |
| 9,052,688 | B2 | 6/2015 | Sekido |
| 9,075,331 | B2 | 7/2015 | Hashimoto et al. |
| 9,128,459 | B2 | 9/2015 | Souda |
| 9,134,686 | B2 | 9/2015 | Yoshikawa et al. |
| 9,134,695 | B2 | 9/2015 | Furukawa et al. |
| 9,146,492 | B2 | 9/2015 | Suzuki |
| 9,146,531 | B2 | 9/2015 | Sato |
| 9,274,501 | B2 | 3/2016 | Okabe |
| 2007/0077087 | A1 | 4/2007 | Okabe et al. |
| 2007/0160385 | A1 | 7/2007 | Noguchi et al. |
| 2008/0159772 | A1 | 7/2008 | Koishi et al. |
| 2008/0159774 | A1 | 7/2008 | Tanabe et al. |
| 2008/0159775 | A1 | 7/2008 | Koishi et al. |
| 2009/0047039 | A1 | 2/2009 | Noguchi et al. |
| 2009/0092412 | A1 | 4/2009 | Kei |
| 2009/0116869 | A1 | 5/2009 | Kotsuka et al. |
| 2009/0245859 | A1 | 10/2009 | Okabe |
| 2009/0290903 | A1 | 11/2009 | Horikawa et al. |
| 2009/0290904 | A1 | 11/2009 | Kawai et al. |
| 2009/0290905 | A1 | 11/2009 | Mizuno et al. |
| 2009/0324275 | A1 | 12/2009 | Okabe |
| 2010/0080619 | A1 | 4/2010 | Kawanami |
| 2010/0124432 | A1 | 5/2010 | Takayama |
| 2010/0239314 | A1 | 9/2010 | Takayama |
| 2011/0013932 | A1 | 1/2011 | Fujita et al. |
| 2011/0217074 | A1 | 9/2011 | Kawanami |
| 2012/0057900 | A1 | 3/2012 | Okabe |
| 2012/0114374 | A1 | 5/2012 | Suzuki |
| 2012/0195627 | A1 | 8/2012 | Kikuchi |
| 2012/0328325 | A1 | 12/2012 | Sato |
| 2012/0328326 | A1 | 12/2012 | Sato |
| 2012/0328327 | A1 | 12/2012 | Sato |
| 2013/0108316 | A1 | 5/2013 | Sato et al. |
| 2013/0136493 | A1* | 5/2013 | Kimura .............. G03G 21/1633 399/111 |
| 2013/0308976 | A1 | 11/2013 | Sekido |
| 2013/0315619 | A1 | 11/2013 | Shuhama et al. |
| 2014/0064782 | A1 | 3/2014 | Furukawa et al. |
| 2014/0137372 | A1 | 5/2014 | Yamashita et al. |
| 2014/0147158 | A1 | 5/2014 | Fujinaka et al. |
| 2014/0186082 | A1 | 7/2014 | Yoshikawa et al. |
| 2014/0210929 | A1 | 7/2014 | Suzuki |
| 2014/0314446 | A1 | 10/2014 | Sato |
| 2015/0010325 | A1 | 1/2015 | Sato et al. |
| 2015/0023691 | A1 | 1/2015 | Sato |
| 2015/0071681 | A1 | 3/2015 | Sato |
| 2015/0110523 | A1 | 4/2015 | Sato |
| 2015/0227110 | A1 | 8/2015 | Yoshimura et al. |
| 2016/0026151 | A1 | 1/2016 | Sato et al. |
| 2016/0231696 | A1 | 8/2016 | Sato |
| 2016/0231700 | A1 | 8/2016 | Sato |
| 2016/0231703 | A1 | 8/2016 | Sato |
| 2017/0343958 | A1 | 11/2017 | Sato |

FOREIGN PATENT DOCUMENTS

| | | | |
|---|---|---|---|
| JP | H11-344905 | A | 12/1999 |
| JP | 2001-337580 | A | 12/2001 |
| JP | 2004-177443 | A | 6/2004 |
| JP | 2005107435 | A | 4/2005 |
| JP | 2007-101635 | A | 4/2007 |
| JP | 2008-165023 | A | 7/2008 |
| JP | 2009-092914 | | 4/2009 |
| JP | 2010-008724 | A | 1/2010 |
| JP | 2010-072308 | A | 4/2010 |
| JP | 2010-102326 | A | 5/2010 |
| JP | 2010-117731 | A | 5/2010 |
| JP | 2010-217813 | A | 9/2010 |
| JP | 2011-059730 | A | 3/2011 |
| JP | 2011-070142 | A | 4/2011 |
| JP | 2012-073656 | A | 4/2012 |
| JP | 2012-230136 | A | 11/2012 |
| JP | 2013-007946 | A | 1/2013 |
| JP | 2013-007947 | A | 1/2013 |
| JP | 2013-007948 | A | 1/2013 |
| JP | 2013-097185 | A | 5/2013 |
| JP | 2013-137494 | A | 7/2013 |
| JP | 2013-242439 | A | 12/2013 |
| JP | 2013-246366 | A | 12/2013 |
| JP | 2014-067005 | A | 4/2014 |
| JP | 2014-067010 | A | 4/2014 |
| JP | 2014063081 | * | 4/2014 |
| JP | 2014-106392 | A | 6/2014 |
| JP | 2014-106393 | A | 6/2014 |
| JP | 2014-123107 | A | 7/2014 |
| JP | 2014-126842 | A | 7/2014 |
| JP | 2014-145964 | A | 8/2014 |
| JP | 2015031830 | * | 2/2015 |
| WO | 2011024491 | A1 | 3/2011 |
| WO | 2014038725 | A1 | 3/2014 |

OTHER PUBLICATIONS

Feb. 5, 2016—Co-pending U.S. Appl. No. 15/016,616.
Feb. 5, 2016—Co-pending U.S. Appl. No. 15/016,646.
Feb. 4, 2016—Co-pending U.S. Appl. No. 15/015,788.
Feb. 4, 2016—Co-pending U.S. Appl. No. 15/015,323.
Feb. 5, 2016—Co-pending U.S. Appl. No. 15/016,638.
May 19, 2016—(US) Non-Final Office Action—U.S. Appl. No. 15/014,137.

(56) References Cited

OTHER PUBLICATIONS

Jun. 3, 2016—(US) Ex-parte Quayle Action—U.S. Appl. No. 15/016,638.
Jun. 6, 2016—(US) Notice of Allowance—U.S. Appl. No. 15/016,581.
Jun. 17, 2016—(US) Non-Final Office Action—U.S. Appl. No. 15/016,616.
Aug. 12, 2016—(US) Notice of Allowance—U.S. Appl. No. 15/014,137.
Jul. 13, 2017—(US) Notice of Allowance—U.S. Appl. No. 15/583,207.
Aug. 11, 2017—(US) Non-Final Office Action—U.S. Appl. No. 15/379,654.
Aug. 23, 2017—(US) Notice of Allowance—U.S. Appl. No. 15/630,391.
Dec. 15, 2017—(US) Non-final Office Action—U.S. Appl. No. 15/803,006.
Jan. 19, 2018—(US) Notice of Allowance—U.S. Appl. No. 15/379,654.
Apr. 24, 2018—(JP) Notice of Reasons for Rejection—App 2015-022597, Eng Tran.
Aug. 10, 2018—(US) Final Office Action—U.S. Appl. No. 15/643,985.
Nov. 7, 2018—(US) Notice of Allowance—U.S. Appl. No. 16/012,970.

* cited by examiner

IMAGE FORMING APPARATUS

CROSS-REFERENCE TO RELATED APPLICATION

This application is a continuation of U.S. application Ser. No. 17/868,843, filed Jul. 20, 2022, which is a continuation of U.S. application Ser. No. 17/066,574, filed Oct. 9, 2020 (now U.S. Pat. No. 11,397,404, issued Jul. 26, 2022), which is a continuation of U.S. application Ser. No. 16/785,736 filed Feb. 10, 2020 (now U.S. Pat. No. 10,802,438, issued Oct. 13, 2020), which is a continuation of U.S. application Ser. No. 16/358,834, filed Mar. 20, 2019 (now U.S. Pat. No. 10,558,164, issued Feb. 11, 2020), which is a continuation of U.S. application Ser. No. 16/012,970, filed Jun. 20, 2018 (now U.S. Pat. No. 10,241,466, issued Mar. 26, 2019), which is a continuation of U.S. application Ser. No. 15/379,654, filed Dec. 15, 2016 (now U.S. Pat. No. 10,007,230, issued Jun. 26, 2018), which is a continuation of U.S. application Ser. No. 15/014,137, filed Feb. 3, 2016 (now U.S. Pat. No. 9,529,321, issued Dec. 27, 2016), which claims priority from Japanese Patent Application No. 2015-022597, filed on Feb. 6, 2015, which are incorporated herein by reference in their entirety.

TECHNICAL FIELD

The present disclosure relates to an image forming apparatus that employs an electrophotographic method.

BACKGROUND

Known electrophotographic image forming apparatuses include a body casing, a plurality of photosensitive drums, a process unit that is detachably attached in the image forming apparatus, and a positioning member for positioning the plurality of photosensitive drums.

Such image forming apparatuses include, in the body casing, for example, a first frame having a plurality of drum positioning grooves and movable link members including plate springs.

Furthermore, such an image forming apparatus is configured so that, by swinging the movable link members, the plate springs press flange members of the photosensitive drum to abut the flange members against the drum positioning grooves of the first frame. With the above, positioning of the photosensitive drum with respect to the body casing is achieved.

SUMMARY

According to one or more aspects of the disclosure, an image forming apparatus may include a body casing, a pressing member, a process cartridge, and a drawer. The body casing may include a positioning member. The pressing member may be disposed inside the body casing. The process cartridge may include a photosensitive drum. The drawer may be configured to support the process cartridge and to move, in a sliding direction orthogonal to an axis direction of the photosensitive drum, between an inside position that is a position inside the body casing and an outside position that is a position outside the body casing. The process cartridge may include an engagement portion and a spring. The engagement portion may be configured to be positioned by the positioning member. The spring may be configured to be pressed by the pressing member such that the engagement portion is pressed toward the positioning member.

According to one or more other aspects of the disclosure, an image forming apparatus may include a body casing, a process cartridge, and a belt unit. The body casing may include a positioning member. The process cartridge may be configured to be detachably attached to the image forming apparatus and include a photosensitive drum and a contacting portion. The belt unit may include a belt and a pressing member and may be configured to contact the photosensitive drum. The contacting portion may be configured to contact the belt and receive a force to press the process cartridge from the pressing member of the belt unit toward the positioning member.

According to one or more other aspects of the disclosure, a process cartridge configured to be detachably attached to an image forming apparatus may include a frame including a bottom wall, a photosensitive drum, and a protruding portion disposed at an upper portion of the process cartridge and protruding toward a direction away from the bottom wall.

DESCRIPTION OF THE PREFERRED EMBODIMENTS

1. Overall Configuration of Image Forming Apparatus

Figure 1:
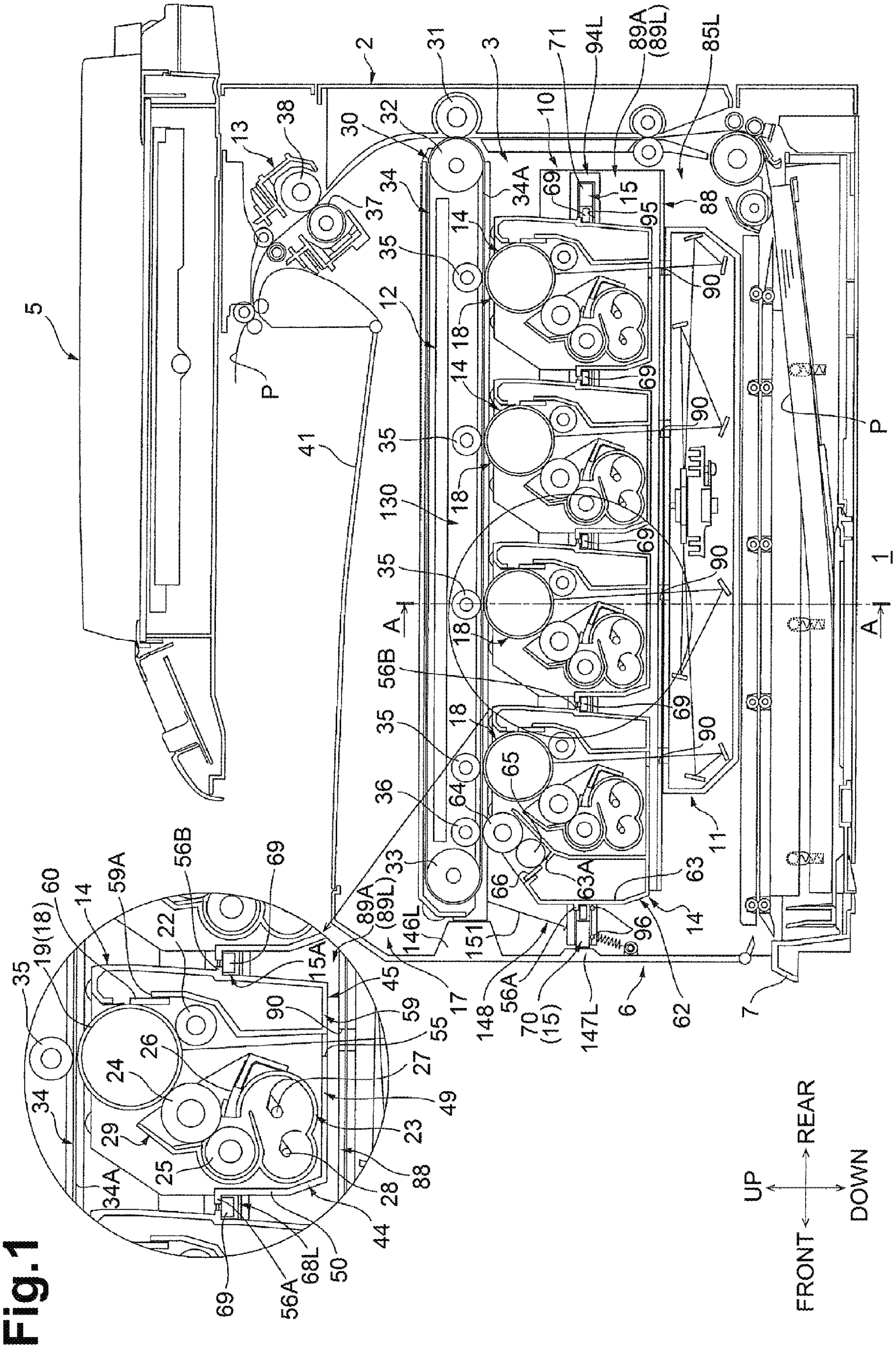
FIG. 1 is a center cross-sectional view of an exemplary embodiment of an image forming apparatus of the present disclosure and illustrates a state in which a front cover is positioned in the closed position and a drawer is positioned in an inside position.

As illustrated in FIG. 1, an image forming apparatus 1 is a horizontally oriented intermediate transfer color printer.

The image forming apparatus 1 includes a body casing 2, an image forming unit 3 that forms an image on a sheet P, and an image reading unit 5 that reads image information of a source document.

The body casing 2 has a substantially box shape. The body casing 2 includes a front cover 6 (as an example of a cover) that closes an opening 17, a sheet supply tray 7, and an ejection tray 41.

The opening 17 is disposed at a front end portion of the body casing 2 and communicates the inside and the outside of the body casing 2 to each other in the front-rear direction. The front cover 6 having the lower end portion thereof as a fulcrum is configured to swing between a closed position (see FIG. 1) that closes the opening 17 and an open position (see FIG. 7) that opens the opening 17.

The sheet supply tray 7 is disposed at a lower end portion inside the body casing 2 and is configured to accommodate sheets P. The sheets P inside the sheet supply tray 7 are transported to a portion between an intermediate transfer belt 34 described later and a secondary transfer roller 31 described later at a predetermined timing by various rollers. The ejection tray 41 is formed on an upper surface of the body casing 2.

The image forming unit 3 includes an exposure unit 11, a transfer unit 12, a fixing unit 13, process cartridges 14, and a drawer 15.

The exposure unit 11 is disposed at a lower portion inside the body casing 2 and above the sheet supply tray 7.

The drawer 15 is disposed inside the body casing 2 at substantially the middle in the up-down direction and above the exposure unit 11. The drawer 15 is configured so as to support the four process cartridges 14. While supporting the four process cartridges 14, the drawer 15 is configured to move through the opening 17 in the front-rear direction between an inside position (see FIG. 1) that is a position inside the body casing 2 and an outside position (see FIG. 12) that is a position outside the body casing 2. In other words, the opening 17 is configured to allow the four process cartridges 14 to pass therethrough.

Note that in the following description, for convenience sake, description will be given while a state in which the front cover 6 is in a closed position and in which the drawer 15 is in the inside position is the standard.

The four process cartridges 14 are disposed at intervals in a parallel manner in the front-rear direction. Each of the four process cartridges 14 includes a photosensitive drum 18, a charging roller 22 that charges the surface of the photosensitive drum 18, and a development unit 29 that supplies toner onto the surface of the photosensitive drum 18.

The transfer unit 12 is disposed at an upper portion inside the body casing 2 and above the drawer 15 that supports the process cartridges 14. The transfer unit 12 includes a belt unit 30 and the secondary transfer roller 31. The belt unit 30 is disposed in the front-rear direction so as to be positioned above all of the photosensitive drums 18. In other words, the four process cartridges 14 are disposed between the belt unit 30 and the exposure unit 11.

The belt unit 30 includes a driving roller 32, a driven roller 33, the intermediate transfer belt 34, four primary transfer rollers 35, and an opposite roller 36.

The driving roller 32 is rotatably supported at the rear end portion of the belt unit 30. The driven roller 33 is rotatably supported at the front end portion of the belt unit 30.

The intermediate transfer belt 34 is stretched across the diving roller 32 and the driven roller 33 such that a transfer surface 34A on the lower portion of the intermediate transfer belt 34 is in contact with the upper end portions of all the photosensitive drums 18. In other words, the belt unit 30 is disposed so as to face the four photosensitive drums 18 in the up-down direction. Furthermore, the drive of the driving roller 32 and the driven roller 33 that is driven move the intermediate transfer belt 34 in a circular manner such that the lower portion of the intermediate transfer belt 34 moves from the front side towards the rear side.

The four primary transfer rollers 35 are disposed at intervals in a parallel manner in the front-rear direction between the driving roller 32 and the driven roller 33. The primary transfer rollers 35 are disposed above the photosensitive drums 18 so as to nip the intermediate transfer belt 34 with the photosensitive drums 18.

The opposite roller 36 is disposed between the primary transfer roller 35 at the very front and the driven roller 33. The secondary transfer roller 31 is disposed behind the driving roller 32 so as to nip the intermediate transfer belt 34 with the driving roller 32.

The fixing unit 13 is disposed above the secondary transfer roller 31. The fixing unit 13 includes a heating roller 37 and a compression roller 38 that comes in pressure contact with the rear upper end portion of the heating roller 37.

The image reading unit 5 is disposed above the body casing 2 so as to cover the ejection tray 41.

Such an image forming apparatus 1 starts an image forming operation with the control of a controller (not shown). When the image forming operation is started, the charging rollers 22 uniformly charge the surfaces of the photosensitive drums 18. Subsequently, as illustrated by solid lines, based on the image data, the exposure unit 11 emits a laser beam towards the surfaces of the plurality of photosensitive drums 18 so that the laser beam passes through laser passage openings 55 and laser passage holes 90 that are described later to expose the photosensitive drums 18. With the above, electrostatic latent images based on the image data is formed on the surfaces of the photosensitive drums 18.

Note that the image data includes, for example, image data that is transmitted to the image forming apparatus 1 from a personal computer (not shown) that is connected to the image forming apparatus 1, and image data read by the image reading unit 5.

Subsequently, each development unit 29 supplies toner to the electrostatic latent image of the corresponding photosensitive drum 18. With the above, each photosensitive drum 18 carries a toner image on the surface thereof.

The toner images carried on the surfaces of the photosensitive drums 18 are, with the primary transfer rollers 35, primarily transferred onto the transfer surface 34A on the lower portion of the intermediate transfer belt 34 that is moving from the front side towards the rear side. With the above, a color image is formed on the transfer surface 34A on the lower portion of the intermediate transfer belt 34.

Subsequently, the secondary transfer roller 31 secondarily transfers the color image formed on the surface of the intermediate transfer belt 34 onto the sheet P supplied from the sheet supply tray 7. Thereafter, the fixing unit 13 heat fixes the color image on the sheet P while the sheet P onto which the color image has been transferred passes through between the heating roller 37 and the compression roller 38. Subsequently, the sheet P on which the color image has been fixed is ejected onto the ejection tray 41 with various rollers.

2. Detail of Drawer

Figures 2A, 2B, 2C:
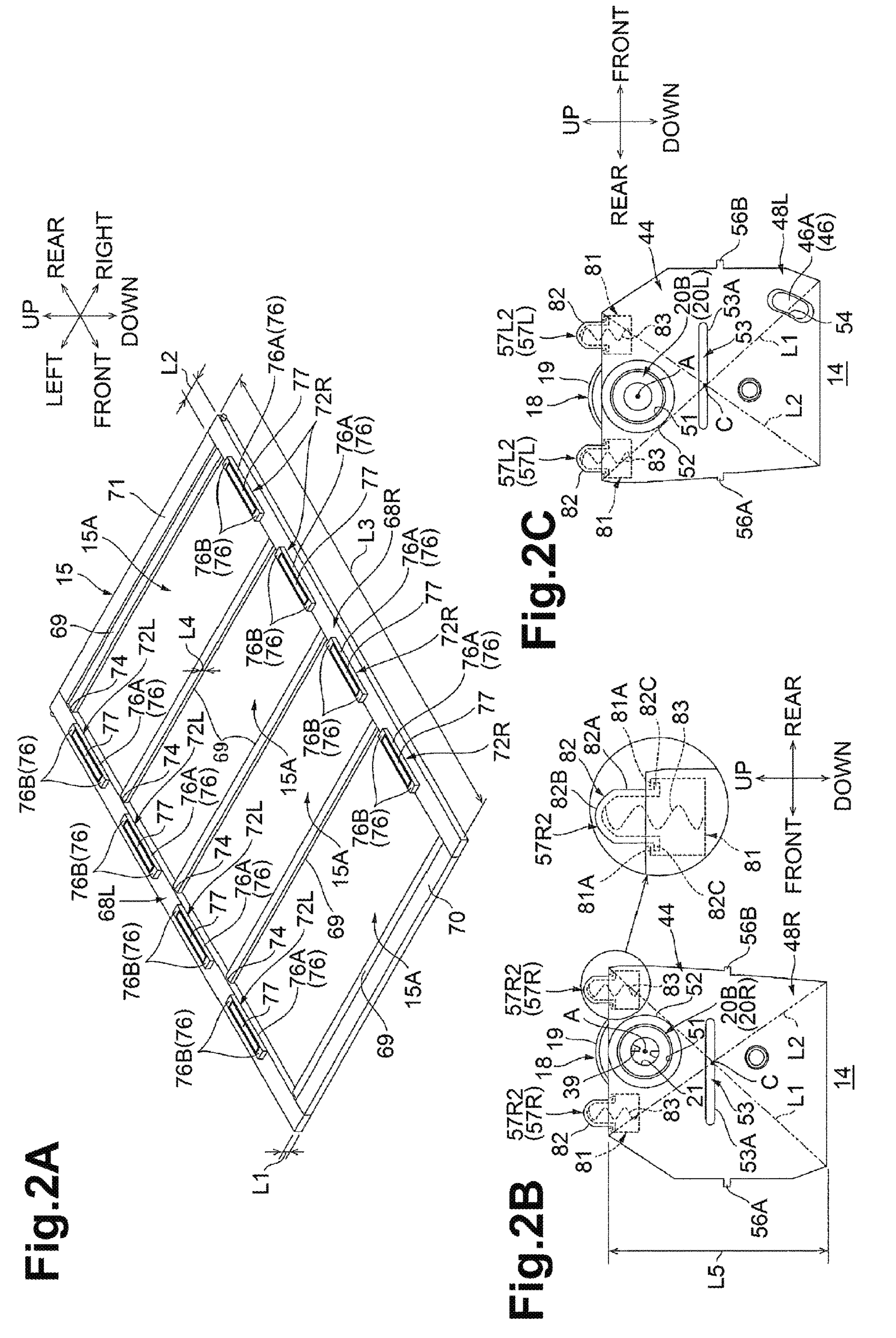
FIG. 2A is a perspective view of the drawer illustrated in FIG. 1 viewed from the upper front.
FIG. 2B is a right side view of a process cartridge illustrated in FIG. 1.
FIG. 2C is a left side view of the process cartridge illustrated in FIG. 1.

As illustrated in FIG. 2A, the drawer 15 has a substantially rectangular frame shape in plan view and includes a first side frame 68R, a second side frame 68L, five beam members 69, a front beam 70, a rear beam 71, four first biasing portions 72R, and four second biasing portions 72L.

(1) Side Frame

The first side frame 68R is disposed at the right end portion of the drawer 15. The second side frame 68L is disposed at the left end portion of the drawer 15 and is positioned at the same vertical position as the position of the first side frame 68R.

The first side frame 68R is formed of a rigid resin material and has a substantially bar-like shape, more specifically, has a substantially prismatic shape, which extends in the front-rear direction. The first side frame 68R includes five fitting holes 74 that are disposed at intervals in the front-rear direction. A dimension L1 of the first side frame 68R in the up-down direction and a dimension L2 thereof in the left-right direction are shorter than a dimension L3 thereof in the front-rear direction. Furthermore, the dimension L1 of the first side frame 68R in the up-down direction is shorter than the dimension L2 thereof in the left-right direction. The five fitting holes 74 of the first side frame 68R each have a substantially rectangular shape in side view and are each recessed towards the right from the left surface of the first side frame 68R.

The second side frame 68L has the same structure as that of the first side frame 68R except that the left and right of the second side frame 68L are opposite to those of the first side frame 68R.

(2) Beam Member

The five beam members 69 are disposed between the first side frame 68R and the second side frame 68L at even intervals in the front-rear direction. The beam members 69 are each formed of a metal material having high rigidity such as stainless steel and each have a substantially bar-like shape, more specifically, a substantially prismatic shape, that extends in the left-right direction.

The right end portion of each beam member 69 is fitted into the corresponding fitting hole 74 of the first side frame 68R. The left end portion of each beam member 69 is fitted into the corresponding fitting hole 74 of the second side frame 68L. With the above, the beam members 69 connect first side frame 68R and the second side frame 68L to each other in the left-right direction. Furthermore, the space between the first side frame 68R and the second side frame 68L is divided into four spaces in the front-rear direction with the five beam members 69. In other words, four insertion openings 15A are formed between the first side frame 68R and the second side frame 68L.

(3) Front Beam and Rear Beam

The front beam 70 is disposed in front of the beam member 69 at the very front between the front end portion of the first side frame 68R and the front end portion of the second side frame 68L. The front beam 70 is formed of a rigid resin material and has a substantially prismatic shape that extends in the left-right direction. The right end portion of the front beam 70 continues to the front end portion of the first side frame 68R. The left end portion of the front beam 70 continues to the front end portion of the second side frame 68L.

The rear beam 71 is disposed behind the beam member 69 at the very back between the rear end portion of the first side frame 68R and the rear end portion of the second side frame 68L. The rear beam 71 is formed of a rigid resin material and has a substantially prismatic shape that extends in the left-right direction. The right end portion of the rear beam 71 continues to the rear end portion of the first side frame 68R. The left end portion of the rear beam 71 continues to the rear end portion of the second side frame 68L.

(4) Biasing Portion

The four first biasing portions 72R are disposed on the upper surface of the first side frame 68R at intervals in the front-rear direction. The four second biasing portions 72L are disposed on the upper surface of the second side frame 68L at intervals in the front-rear direction. Each of the four first biasing portions 72R and the corresponding one of the four second biasing portions 72L are disposed at an interval in the left-right direction so as to have the corresponding one of the four insertion openings 15A therebetween.

Figure 5:
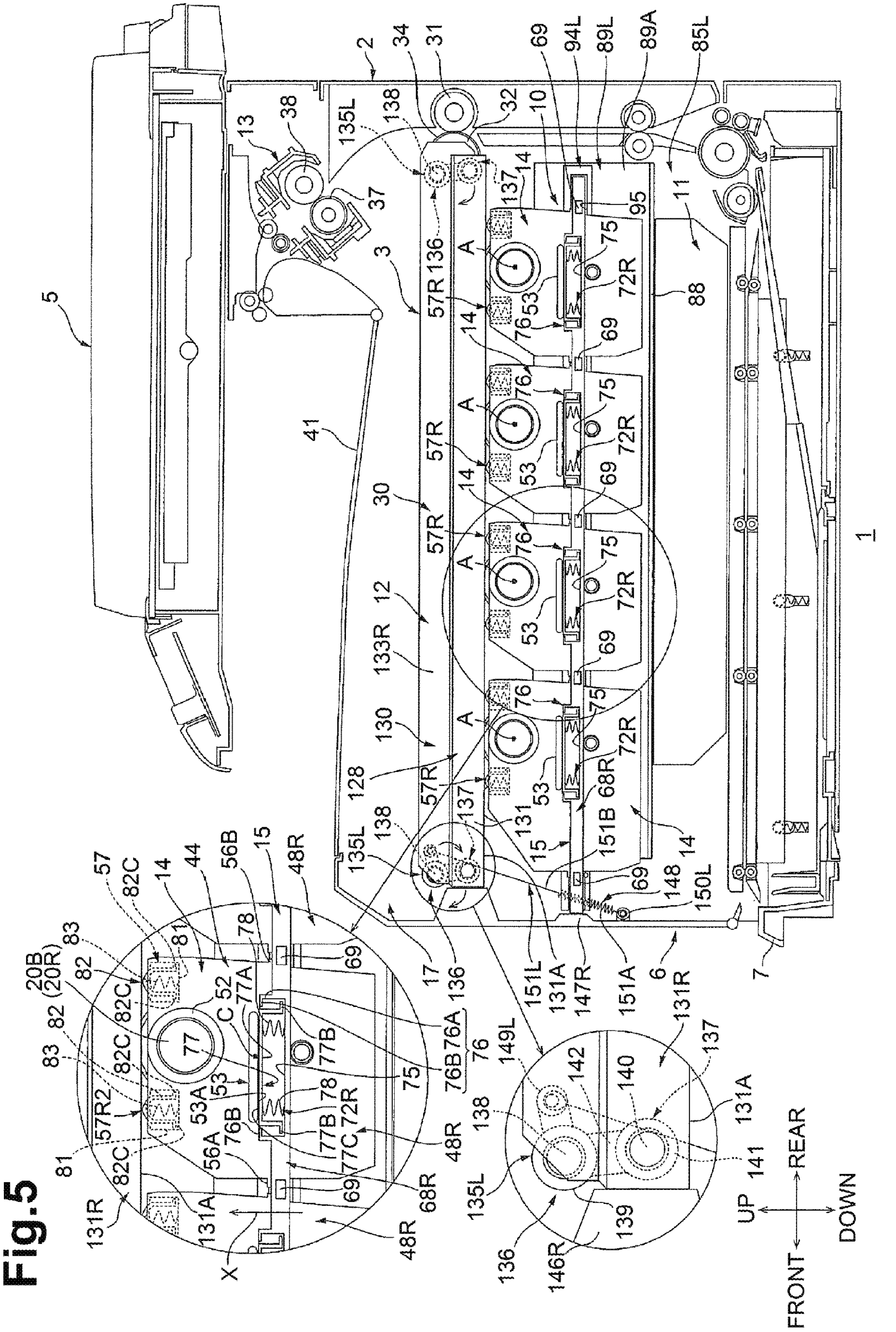
FIG. 5 is a cross-sectional view taken along line B-B of the image forming apparatus illustrated in FIG. 4.

As illustrated in FIGS. 2A and 5, the first biasing portions 72R each include an accommodation recess 75 (as an example of a recess), a guide portion 76 (a first guide portion), an advancing/retreating portion 77 (a first advancing/retreating portion), and two biasing members 78.

As illustrated in FIG. 5, the accommodation recesses 75 each have a substantially rectangular shape that extends in the front-rear direction in side view and are each recessed downwards from the upper surface of the first side frame 68R.

As illustrated in FIG. 2A, each guide portion 76 is disposed on the upper surface of the first side frame 68R so as to surround the corresponding accommodation recess 75 in plan view. Each guide portion 76 integrally includes a frame portion 76A and two restricting protrusions 76B. On the upper surface of the first side frame 68R, each frame portion 76A protrudes upwards with respect to the entire peripheral edge of the corresponding accommodation recess 75.

The two restricting protrusions 76B are disposed at the upper end portion of each guide portion 76 and at an interval in the front-rear direction. As illustrated in FIG. 5, between the two restricting protrusions 76B, the restricting protrusion 76B at the front protrudes towards the rear side from an upper end portion of a front wall of the frame portion 76A. Between the two restricting protrusions 76B, the restricting protrusion 76B at the back protrudes towards the front side from an upper end portion of a rear wall of the frame portion 76A. As illustrated in FIG. 2A, the left end portion of each restricting protrusion 76B is connected to an upper end portion of a left sidewall of the corresponding frame portion 76A. The right end portion of each restricting protrusion 76B is connected to an upper end portion of a right sidewall of the corresponding frame portion 76A.

As illustrated in FIG. 5, each advancing/retreating portion 77 is accommodated inside the corresponding accommodation recess 75 and guide portion 76. Each advancing/retreating portion 77 integrally includes a contact portion 77A and two restriction portions 77B.

As illustrated in FIG. 5, the contact portion 77A is disposed between the corresponding two restricting protrusions 76B in the front-rear direction. Each contact portion 77A has a substantially rectangular shape that extends in the front-rear direction in plan view and, as illustrated in FIG. 5, has a substantially recessed shape that is open downwards in side view. Furthermore, an upper surface 77C (a third contact surface) of each contact portion 77A (a first contact portion) faces upwards and extends in both the left-right direction and the front-rear direction.

Among the two restriction portions 77B, the restriction portion 77B at the front (a first restriction portion) is disposed at the front end portion of the advancing/retreating portion 77 and at the front end portion of the first biasing portion 72R. Among the two restriction portions 77B, the restriction portion 77B at the rear (a second restriction portion) is disposed at the rea end portion of the advancing/retreating portion 77 and at the rear end portion of the first biasing portion 72R. The restriction portion 77B at the front protrudes towards the front side from a lower end portion of the front wall of the contact portion 77A. The restriction portion 77B at the rear protrudes towards the rear side from a lower end portion of the rear wall of the contact portion 77A. Furthermore, the restriction portions 77B are disposed below the restricting protrusions 76B.

Between the two biasing members 78, the biasing member 78 at the front (a first biasing member) is a compression spring that is disposed inside and at the front end portion of the contact portion 77A in a compressed state. Between the two biasing members 78, the biasing member 78 at the rear (a second biasing member) is a compression spring that is disposed inside and at the rear end portion of the contact portion 77A in a compressed state. When viewed in the left-right direction, the front biasing member 78 and the rear biasing member 78 are disposed in front of and behind a center C of the process cartridge 14 so as to have the center C of the process cartridge 14 in between. The compression springs are coil springs that extend in the up-down direction. The upper end portion of the biasing member 78 is in contact with the underside of the upper wall of the contact portion 77A, and the lower end portion of the biasing member 78 is in contact with the bottom surface of the accommodation recess 75. With the above, the two biasing members 78 bias the corresponding advancing/retreating portion 77 upwards.

Figure 4:
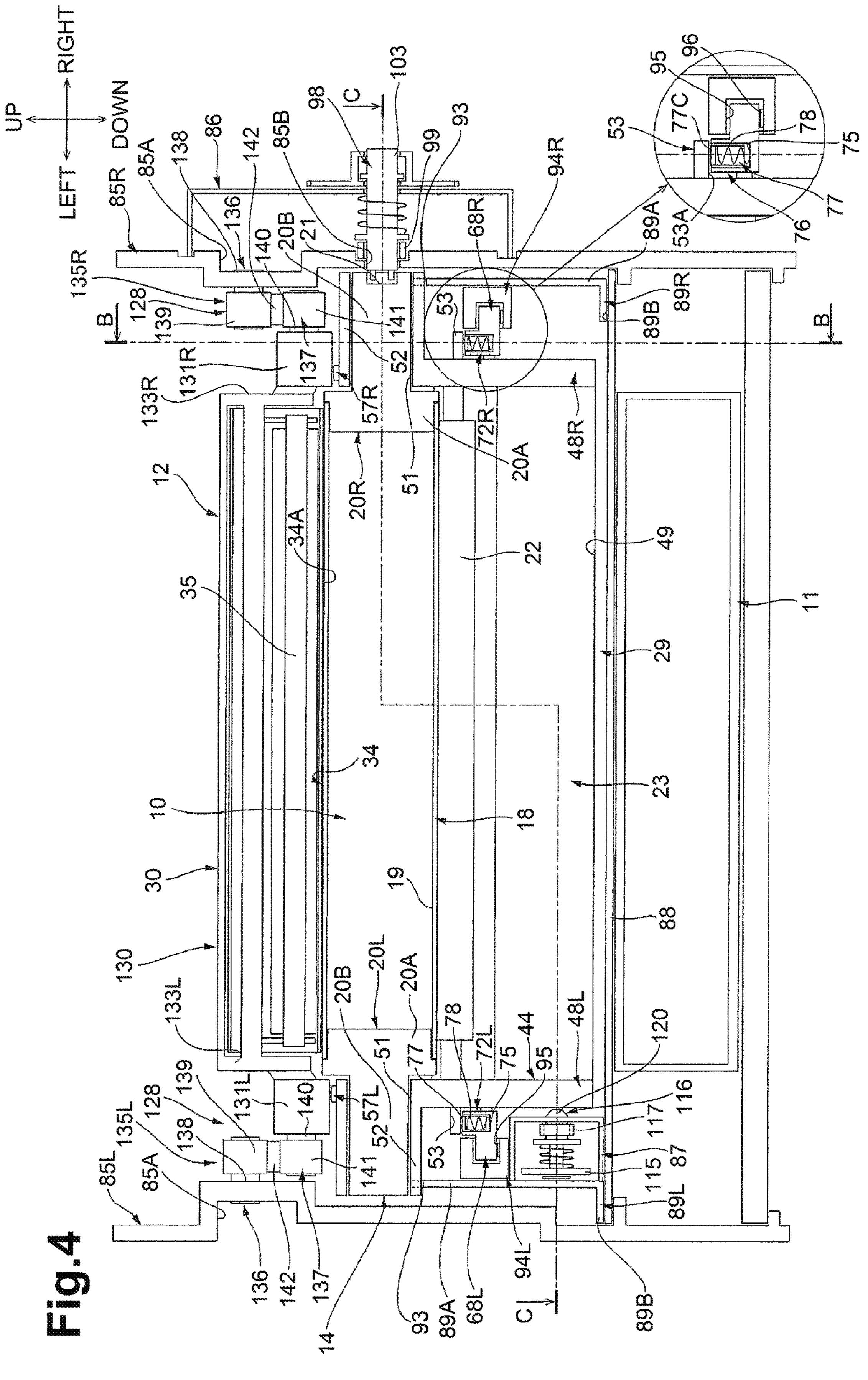
FIG. 4 is a cross-sectional view taken along line A-A of the image forming apparatus illustrated in FIG. 1.

As illustrated in FIGS. 4 and 5, the second biasing portions 72L each have the same structure as that of the first biasing portions 72R except that the left and right of the second biasing portions 72L are opposite to those of the first biasing portions 72R. Each second biasing portion 72L includes the accommodation recess 75, the guide portion 76 (a second guide portion), the advancing/retreating portion 77 (a second advancing/retreating portion), the biasing member 78 at the front (a third biasing member) and a biasing member 78 at the rear (fourth biasing member). Each advancing/retreating portion 77 includes the contact portion 77A (a second contact portion), the restriction portion 77B at the front (a third restriction portion), the restriction portion 77B at the rear (a fourth restriction portion), and the upper surface 77C (fourth contact surface).

3. Detail of Process Cartridge

As illustrated in FIGS. 1, 2B, and 2C, each process cartridge 14 includes a cartridge frame 44 (as an example of a frame), the photosensitive drum 18, the charging roller 22, the development unit 29, a cartridge electrode 46, a drum cleaning unit 45, a first engagement rib 56A, a second engagement rib 56B, a first press unit 57R (as an example of a spring, a contacting portion), and a second press unit 57L. Furthermore, among the four process cartridges 14, the process cartridge 14 at the very front includes a belt cleaning unit 62.

(1) Cartridge Frame

Each cartridge frame 44 has a substantially prismatic shape that extends in the left-right direction. A dimension L5 of the cartridge frame 44 in the up-down direction is larger than the dimension L1 of the first side frame 68R in the up-down direction. As illustrated in FIGS. 1, 2B, and 2C, each cartridge frame 44 includes a first sidewall 48R, a second sidewall 48L, and a bottom wall 49.

The first sidewall 48R is disposed at the right end portion of the cartridge frame 44. The second sidewall 48L is disposed at the left end portion of the cartridge frame 44.

As illustrated in FIG. 2B, the first sidewall 48R has a substantially rectangular and tabular shape in side view. The first sidewall 48R includes a flange insertion hole 51, an engagement portion 52, and a projection 53 (a first projection).

The flange insertion hole 51 is disposed at the upper portion of the first sidewall 48R and at substantially the middle of the first sidewall 48R in the front the front rear direction. The flange insertion hole 51 has a substantially circular shape in side view and penetrates the first sidewall 48R in the left-right direction.

As illustrated in FIG. 4, the engagement portion 52 is disposed on the right surface of the first sidewall 48R and has a substantially cylindrical shape that protrudes towards the right side from the entire peripheral edge of the flange insertion hole 51 in the first sidewall 48R.

As illustrated in FIG. 2B, the projection 53 is disposed in substantially the middle of the right surface of the first sidewall 48R in the up-down direction and is disposed below the engagement portion 52 so as to be spaced apart therefrom. When viewed in the left-right direction, the projection 53 is disposed so as to overlap the center C of the process cartridge 14.

Note that the center C of the process cartridge 14 is the intersection point between the diagonal line L1 connecting a rear upper corner and a front lower corner of the first sidewall 48R and the diagonal line L2 connecting a rear lower corner and a front upper corner of the first sidewall 48R.

The projection 53 has a substantially tabular shape that extends in the front-rear direction, and when viewed in the up-down direction, extends so as to overlap the central axis line of the engagement portion 52. Furthermore, as illustrated in FIG. 4, the projection 53 protrudes towards the right from the right surface of the first sidewall 48R. The dimension of the projection 53 in the left-right direction is smaller than the dimension of the engagement portion 52 in the left-right direction. An underside 53A (a first contact surface) of the projection 53 faces downwards and extends in both the left-right direction and the front-rear direction.

As illustrated in FIG. 2C, the second sidewall 48L has a substantially rectangular and tabular shape in side view. The second sidewall 48L includes the flange insertion hole 51, the engagement portion 52, the projection 53 (a second projection) including the underside 53A (a second contact surface), and an electrode opening 54. The flange insertion hole 51, the engagement portion 52, and the projection 53 of the second sidewall 48L have the same structures as those of the flange insertion hole 51, the engagement portion 52, and the projection 53 of the first sidewall 48R except that the left and right thereof are opposite.

The electrode opening 54 is disposed in the lower and front end portion of the second sidewall 48L. The electrode opening 54 has a substantially elliptical shape that extends in a direction connecting the front upper side and the rear lower side in side view and penetrates the second sidewall 48L in the left-right direction.

As illustrated in FIG. 1, each bottom wall 49 is provided across the lower end portion of the corresponding first sidewall 48R and the lower end portion of the corresponding second sidewall 48L and has a substantially rectangular and tabular shape in bottom view. Each bottom wall 49 includes, at the rear portion thereof, the laser passage opening 55. Each laser passage openings 55 penetrates the corresponding bottom wall 49 in the up-down direction.

Furthermore, among the four process cartridges 14, each of the process cartridges 14 other than the process cartridge 14 at the very front further includes a front wall 50 in the cartridge frame 44 thereof.

Each front wall 50 is provided across the lower portion of the front end portion of the corresponding first sidewall 48R and the lower portion of the front end portion of the corresponding second sidewall 48L and has a substantially rectangular and tabular shape in front view. The lower end portion of each front wall 50 is connected to the front end portion of the corresponding bottom wall 49.

(2) Photosensitive Drum

As illustrated in FIGS. 1 and 4, each photosensitive drum 18 is disposed at substantially the middle of the upper end portion of the corresponding process cartridge 14 in the front-rear direction. As illustrated in FIG. 4, each photosensitive drum 18 includes a drum body 19, a first flange 20R, and a second flange 20L.

Each drum body 19 has a substantially cylindrical shape that extends in the left-right direction. Each drum body 19 includes a photosensitive layer disposed on the surface.

Each first flange 20R is disposed on the right end portion of the corresponding photosensitive drum 18. Each first flange 20R integrally includes a first portion 20A and a second portion 20B. Each first portion 20A has a substantially columnar shape that is the left portion of the first flange 20R and that extends in the left-right direction. The outside diameter of the first portion 20A is substantially the same as the inside diameter of the drum body 19.

Each second portion 20B is the right portion of the corresponding first flange 20R. Each second portion 20B has a substantially columnar shape that shares the central axis line of the corresponding first portion 20A and extends towards the right from the right end surface of the corresponding first portion 20A. The outside diameter of the second portion 20B is smaller than the outside diameter of the first portion 20A and is substantially the same as the inside diameter of the flange insertion hole 51.

As illustrated in FIG. 2B, each first flange 20R includes a coupling recess 21 and a pair of protrusions 39.

The coupling recess 21 is disposed in the right end surface of the second portion 20B of the first flange 20R. The coupling recess 21 has a substantially circular shape in side view and is recessed from the right end surface of the second portion 20B towards the left.

The pair of protrusions 39 are disposed inside the coupling recess 21 at an interval in the radial direction of the coupling recess 21. Each protrusion 39 has a substantially rectangular shape in side view and protrudes in the radially inward direction from the inner circumferential surface of the corresponding coupling recess 21.

Furthermore, as illustrated in FIG. 4, the first flange 20R is supported by the drum body 19 by inserting the first portion 20A into the right end portion of the drum body 19 in a relatively non-rotatable manner.

As illustrated in FIG. 2B, by having the second portion 20B of the first flange 20R be inserted into the flange insertion hole 51 and be supported by the engagement portion 52, the above photosensitive drum 18 is supported by the first sidewall 48R in a rotatable manner about a central axis line A serving as a rotation center. Note that when projected in the up-down direction, the central axis line A of the photosensitive drum 18 overlaps the rear portion of the projection 53.

As illustrated in FIG. 4, each second flange 20L is disposed on the left end portion of the corresponding photosensitive drum 18. Each second flange 20L has the same structure as that of the first flange 20R except that the left and right are opposite and that the second flange 20L is not provided with the coupling recess 21 and the pair of protrusions 39.

(3) Charging Roller and Development Unit

As illustrated in FIG. 1, each charging roller 22 is disposed at the rear lower portion the corresponding photosensitive drum 18. The front upper end portion of each charging roller 22 is in contact with the rear lower end portion of the corresponding photosensitive drum 18.

Each development unit 29 is disposed at the front lower portion of the corresponding photosensitive drum 18. Each development unit 29 includes a development frame 23, a developing roller 24, a supply roller 25, a layer thickness regulating blade 26, a first agitator 27, and a second agitator 28.

Each development frame 23 has a substantially hollow shape in which the two left and right end portions are closed and is configured to accommodate toner. Each developing roller 24 is configured to carry toner on the surface and is configured to supply toner on the surface of the corresponding photosensitive drum 18. Each supply roller 25 is configured to supply toner inside the corresponding development frame 23 to the corresponding developing roller 24. Each layer thickness regulating blade 26 is configured to regulate the thickness of the toner carried on the corresponding developing roller 24. Each first agitator 27 is configured to mix the toner inside the corresponding development frame 23 and to supply the toner to the corresponding supply roller 25. Each second agitator 28 is configured to mix the toner inside the corresponding development frame 23 and to supply the toner to the corresponding first agitator 27.

(4) Cartridge Electrode

Figure 6:
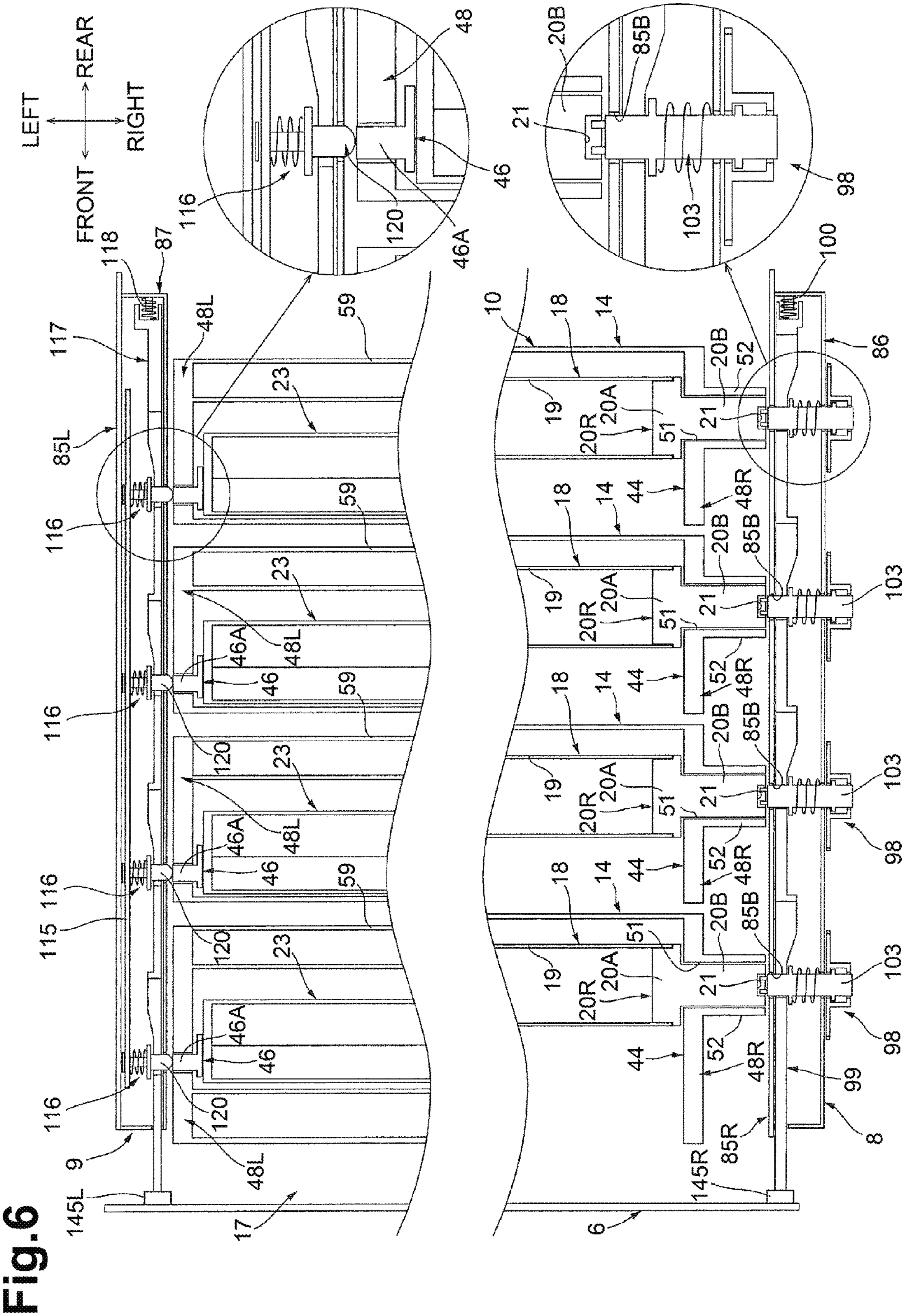
FIG. 6 is a cross-sectional view taken along line C-C of the image forming apparatus illustrated in FIG. 4.

As illustrated in FIGS. 2C and 6, each cartridge electrode 46 is configured to supply electric power from a power supply unit 9 described later to the corresponding developing roller 24 and the corresponding supply roller 25. As illustrated in FIGS. 6, each cartridge electrode 46 is disposed on the left surface of the left sidewall of the corresponding development frame 23 and includes an electric contact 46A.

As illustrated in FIG. 2C, each electric contact 46A has a substantially elliptical shape in side view that extends in the direction connecting the front upper side and the rear lower side. Furthermore, by being inserted into the corresponding electrode opening 54, each electric contact 46A is exposed from the corresponding second sidewall 48L. The left end surface of the electric contact 46A and the left surface of the second sidewall 48L are substantially flush with each other.

(5) Drum Cleaning Unit

As illustrated in FIG. 1, each drum cleaning unit 45 is configured to collect waste toner from the surface of the corresponding photosensitive drum 18. Each drum cleaning unit 45 is disposed in the rear end portion of the corresponding process cartridge 14 and at the rear of the corresponding photosensitive drum 18. Each drum cleaning unit 45 includes a frame 59 and a cleaning blade 60.

Each frame 59 is disposed between the rear end portion of the first sidewall 48R and the rear end portion of the second sidewall 48L and has a substantially polygonal tube shape that extends in the left-right direction. The right end portion of each frame 59 is closed by the corresponding first sidewall 48R, and the left end portion of each frame 59 is closed by the corresponding second sidewall 48L. Each frame 59 includes an opening 59A in the portion that faces the corresponding photosensitive drum 18.

Each cleaning blade 60 has a substantially tabular shape that extends in the up-down direction. The lower end portion of each cleaning blade 60 is fixed to the lower circumferential edge of the opening 59A of the corresponding frame 59, and the upper end portion of each cleaning blade 60 is in contact with the rear end portion of the drum body 19 of the corresponding photosensitive drum 18.

(6) Belt Cleaning Unit

The belt cleaning unit 62 is configured to collect waste toner from the surface of the intermediate transfer belt 34. The belt cleaning unit 62 is disposed at the front end portion of the process cartridge 14 at the very front and is disposed in front of the development unit 29. The belt cleaning unit 62 includes a frame 63, a primary roller 64, a secondary roller 65, and a cleaning blade 66.

The frame 63 is disposed between the front end portion of the first sidewall 48R and the front end portion of the second sidewall 48L and has a substantially polygonal tube shape that extends in the left-right direction. The right end portion of the frame 63 is closed by the corresponding first sidewall 48R, and the left end portion of the frame 63 is closed by the corresponding second sidewall 48L. The frame 63 includes an opening 63A in the upper rear end portion thereof.

The primary roller 64 is disposed below the opposite roller 36 so as to nip the intermediate transfer belt 34 with the opposite roller 36. The secondary roller 65 disposed at the front lower portion of the primary roller 64 and at the rear upper portion of the opening 63A. The rear upper end portion of the secondary roller 65 is in contact with the front lower end portion of the primary roller 64.

The cleaning blade 66 has a substantially tabular shape that extends in a direction connecting the front upper side and the rear lower side. The front upper end portion of the cleaning blade 66 is connected to the upper circumferential edge of the opening 63A of the frame 63, and the lower rear end portion of the cleaning blade 66 is in contact with the lower front end portion of the secondary roller 65.

(7) Engagement Rib

As illustrated in FIG. 1, each first engagement rib 56A is disposed at the front end portion of the corresponding process cartridge 14. Each second engagement rib 56B is disposed at the rear end portion of the corresponding process cartridge 14 and is positioned at the same vertical position as that of the corresponding first engagement rib 56A.

Specifically, in the process cartridge 14 at the very front, the first engagement rib 56A protrudes forward continuously from the substantially vertically middle portion of the front side of the frame 63 of the belt cleaning unit 62, and the second engagement rib 56B protrudes rearward continuously from the substantially vertically middle portion of the rear surface of the frame 59 of the drum cleaning unit 45.

Furthermore, in each of the process cartridges 14 other than the process cartridge 14 at the very front, the first engagement rib 56A protrudes forward continuously from the upper end portion of the front wall 50, and the second engagement rib 56B protrudes rearward continuously from the substantially vertically middle portion in the rear surface of the frame 59 of the drum cleaning unit 45.

(8) Press Unit

As illustrated in FIG. 2B, each first press unit 57R is disposed at the right end portion of the corresponding process cartridge 14. As illustrated in FIG. 2C, each second press unit 57L is disposed at the left end portion of the corresponding process cartridge 14.

As illustrated in FIG. 2B, each first press unit 57R includes two pressed portions 57R2 (as an example of a protruding portion). The two pressed portions 57R2 are disposed at an interval in the front-rear direction when viewed in the left-right direction so as to have the corresponding photosensitive drum 18 in between. Each of the pressed portions 57R2 includes a support frame 81, an abutted portion 82 (a first abutted portion), and a biasing member 83 (a first cartridge biasing member).

Each support frame 81 is disposed at the upper end portion of the left surface of the corresponding first sidewall 48R. Each support frame 81 has a substantially recessed shape that is open upwards in side view and protrudes leftwards continuously from the left surface of the corresponding first sidewall 48R. Furthermore, the left end portion of each support frame 81 is closed. Each support frame 81 includes two engagement protrusions 81A.

The two engagement protrusions 81A are disposed at the upper end portion of the corresponding support frame 81 and at an interval in the front-rear direction. Among the two engagement protrusions 81A, the engagement protrusion 81A at the front protrudes rearward continuously from the upper end portion of the front wall of the corresponding support frame 81. Among the two engagement protrusions 81A, the engagement protrusion 81A at the rear protrudes forward continuously from the upper end portion of the rear wall of the corresponding support frame 81.

Each of the abutted portions 82 is supported by the corresponding support frame 81 so as to be movable in the up-down direction. Each abutted portion 82 integrally includes a cylindrical portion 82A, an arc portion 82B, and two restriction projections 82C.

Each cylindrical portion 82A has a substantially polygonal tube shape that extends in the up-down direction. Each arc portion 82B closes the upper end portion of the corresponding cylindrical portion 82A. Each arc portion 82B has a substantially semi-circular arc shape that protrudes upwards in side view. Among the two restriction projections 82C, the restriction projection 82C at the front protrudes forward continuously from the lower end portion of the front wall of the corresponding cylindrical portion 82A. Among the two restriction projections 82C, the restriction projection 82C at the rear protrudes backward continuously from the lower end portion of the rear wall of the corresponding cylindrical portion 82A.

Furthermore, each abutted portion 82 is inserted into the corresponding support frame 81 so that the corresponding restriction projections 82C are positioned below the corresponding engagement protrusions 81A.

With the above, each abutted portion 82 is capable of moving in the up-down direction between an advance position in which the abutted portion 82 advances upwards, in other words, towards the transfer unit 12 side, until the restriction projections 82C come in contact with the engagement protrusions 81A from below (see FIG. 10) and a retreat position in which the abutted portion 82 retreats downwards, in other words, so as to become closer to the exposure unit 11 with respect to the advance position, so that the cylindrical portion 82A is accommodated inside the support frame 81 (see FIG. 5).

Each biasing member 83 having elastic force is a coil spring that extends in the up-down direction. Each biasing member 83 is disposed in a compressed state between the bottom wall of the corresponding support frame 81 and the arc portion 82B of the corresponding abutted portion 82. The lower end portion of each biasing member 83 is in contact with the upper surface of the bottom wall of the corresponding support frame 81 and the upper end portion of each biasing member 83 is in contact with the underside of the corresponding arc portion 82B. Furthermore, each biasing member 83 is accommodated inside the corresponding cylindrical portion 82A so that the biasing member 83 comes in contact with the inner circumferential surface of the cylindrical portion 82A of the corresponding abutted portion 82.

With the above, each abutted portion 82 is normally biased towards the advance position with the corresponding biasing member 83. Note that in a state in which the front cover 6 is positioned at the closed position, the abutted portion 82 is abutted from above with the first pressing member 131R described later and is pressed downwards while countering the biasing force of the biasing member 83 such that the abutted portion 82 is positioned at the retreat position.

As illustrated in FIG. 2C, each second press unit 57L includes two pressed portions 57L2. The pressed portions 57L2 of each second press unit 57L includes the support frame 81, the abutted portion 82 (a second abutted portion), and the biasing member 83 (a second cartridge biasing member). The second press unit 57L has the same structure as that of the first press unit 57R except that the left and right of the second press unit 57L are opposite to those of the first press unit 57R.

(9) Mount State of Process Cartridge on Drawer

As illustrated in FIG. 5, each process cartridge 14 is inserted into the corresponding insertion opening 15A of the drawer 15 in the up-down direction such that the underside 53A of the projection 53 of each first sidewall 48R comes in contact with the upper surface 77C of the contact portion 77A of the corresponding first biasing portion 72R and that the underside 53A of the projection 53 of each second sidewall 48L comes in contact with the upper surface 77C of the contact portion 77A of the corresponding second biasing portion 72L.

With the above, the four process cartridges 14 are supported by the drawer 15 so as to be disposed between the first side frame 68R and the second side frame 68L in the left-right direction. Below the drawer 15, the lower portions of the process cartridges 14 are exposed from the drawer 15, and above the drawer 15, the upper portions of the process cartridges 14 are exposed from the drawer 15.

Furthermore, the process cartridges 14 are configured so as to be capable of moving linearly in the up-down direction between an engagement position (see FIGS. 1 and 5) and a disengagement position (FIGS. 7 and 10) that is positioned above the engagement position. The engagement position is a position in which, in a state in which the process cartridges 14 are supported by the drawer 15, the first engagement ribs 56A are in contact with the beam members 69 at the front of the process cartridges 14 from above and the second engagement ribs 56B are in contact with the beam members 69 at the rear of the process cartridges 14. The disengagement position is a position in which the first engagement ribs 56A are spaced apart in the upward direction from the beam members 69 at the front of the process cartridges 14 and the second engagement ribs 56B are spaced apart in the upward direction from the beam members 69 at the rear of the process cartridges 14. In other words, in the engagement position (see FIG. 5), the process cartridges 14 are positioned upstream in a direction X that relatively dismounts the process cartridges 14 from the drawer 15, and in the disengagement position (see FIG. 10), the process cartridges 14 are positioned downstream in the direction X that relatively dismounts the process cartridges 14 from the drawer 15.

Furthermore, the process cartridges 14 are normally biased towards the disengagement position, in other words, towards the belt unit 30, with the first biasing portions 72R and the second biasing portions 72L.

Note that when the abutted portions 82 are in the retreat position, the process cartridges 14 are positioned in the engagement position by being pressed downwards while the biasing force of the two biasing members 83 of each first press units 57R and the biasing force of the two biasing members 83 of each second press units 57L counter the biasing force of the two biasing members 78 of each of the first biasing portions 72R of the drawer 15 and the biasing force of the two biasing members 78 of each of the second biasing portions 72L of the drawer 15.

4. Detail of Body Casing

As illustrated in FIG. 4, the body casing 2 includes a first inner wall 85R, a second inner wall 85L, a connection plate 88, a first positioning member 89R, a second positioning member 89L, a first guide rail 94R, and a second guide rail 94L.

(1) Inner Wall

The first inner wall 85R is disposed at the right end portion of the body casing 2. The second inner wall 85L is disposed at the left end portion of the body casing 2. In other words, the first inner wall 85R and the second inner wall 85L are disposed so as to be spaced apart from each other in the left-right direction such that the exposure unit 11, the drawer 15 supporting the process cartridges 14, and the transfer unit 12 are positioned therebetween.

The first inner wall 85R extending in the front-rear direction has a substantially rectangular and tabular shape in side view and includes a recess 85A and four insertion holes 85B.

The recess 85A is disposed at the upper portion of the first inner wall 85R. The recess 85A has a substantially recessed shape open towards the right in front view and is recessed from the right surface of the first inner wall 85R towards the left. The recess 85A extends across the entire first inner wall 85R in the front-rear direction.

As illustrated in FIG. 6, the four insertion holes 85B are disposed at the upper portion of the first inner wall 85R and below the recess 85A so as to be spaced apart from each other in the front-rear direction.

The insertion holes 85B each have a substantially circular shape in side view and penetrate the first inner wall 85R in the left-right direction.

Note that in a state in which the drawer 15 supporting the process cartridges 14 is positioned at an inside position, each of the insertion holes 85B faces the coupling recess 21 of the corresponding photosensitive drum 18.

As illustrated in FIG. 4, the second inner wall 85L extending in the front-rear direction has a substantially rectangular and tabular shape in side view and includes the recess 85A. The recess 85A of the second inner wall 85L has the same structure as that of the recess 85A of the first inner wall 85R except that the left and right of the recess 85A of the second inner wall 85L are opposite to those of the recess 85A of the first inner wall 85R.

(2) Connection Plate

The connection plate 88 is provided between the exposure unit 11 and the process cartridges 14 in the up-down direction and across the lower portion of the first inner wall 85R and the lower portion of the second inner wall 85L. Furthermore, the underside of the connection plate 88 is connected to the upper end portion of the exposure unit 11.

The connection plate 88 is formed of metal and has a substantially rectangular and tabular shape in plan view. As illustrated in FIG. 1, the connection plate 88 includes the four laser passage holes 90.

The four laser passage holes 90 are disposed at intervals in the front-rear direction. The laser passage holes 90 penetrate the connection plate 88 in the up-down direction and each have a size and a shape that allows the laser beam to pass therethrough.

(3) Positioning Member

As illustrated in FIG. 4, the first positioning member 89R is disposed at the right end portion of the body casing 2. The second positioning member 89L is disposed at the left end portion of the body casing 2. In other words, the first positioning member 89R and the second positioning member 89L are disposed on the upper surface of the connection plate 88 while being space apart in the left-right direction so as to have the drawer 15 in between.

The first positioning member 89R is disposed below an engagement portion 52 of the first sidewall 48R. In other words, the first positioning member 89R is disposed on the exposure unit 11 side with respect to the second portions 20B of the first flanges 20R of the photosensitive drums 18.

The first positioning member 89R is a substantially L-shaped tabular piece formed of metal in front view and extends in the front-rear direction. Specifically, the first positioning member 89R integrally includes a body portion 89A and a connection portion 89B.

Figure 12:
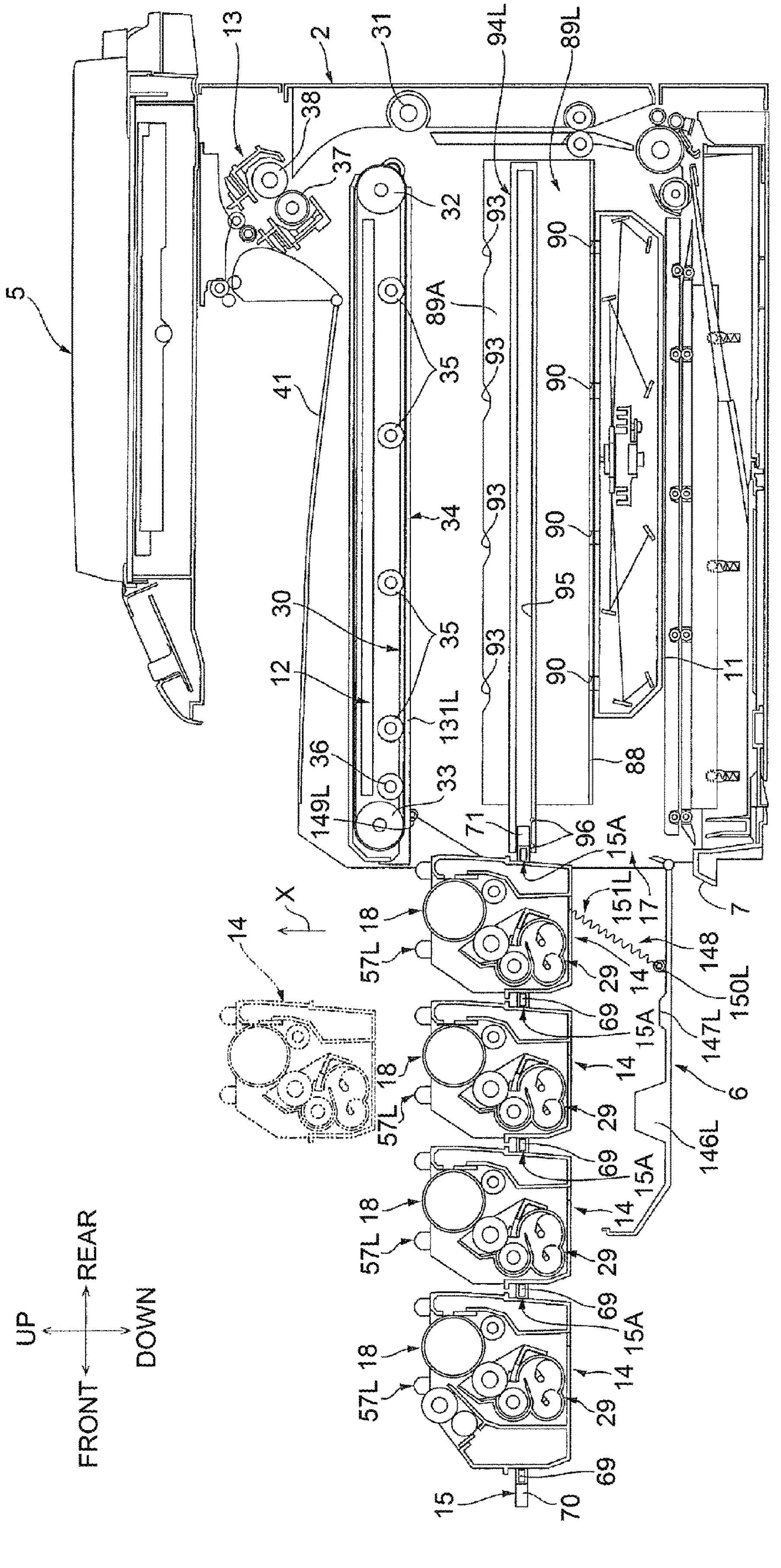
FIG. 12 is a center cross-sectional view of the exemplary embodiment of the image forming apparatus illustrated in FIG. 1 and illustrates a state in which the front cover is positioned in the open position and the drawer is positioned in an outside position.

The body portion 89A has a substantially rectangular and tabular shape that extends in the front-rear direction in side view and is disposed on the left side of the first inner wall 85R so as to be spaced apart from the first inner wall 85R. As illustrated in FIGS. 4 and 12, the body portion 89A includes four positioning recesses 93.

As illustrated in FIG. 12, the four positioning recesses 93 are disposed on the upper end portion of the body portion 89A at intervals in the front-rear direction. The positioning recesses 93 each have a substantially trapezoidal shape in side view that is tapered downwards. Each positioning recess 93 is recessed downwards from the upper edge of the body portion 89A. Each positioning recess 93 extends along the outer peripheral surface of the corresponding engagement portion 52.

As illustrated in FIG. 4, the connection portion 89B protrudes leftwards continuously from the lower end portion of the body portion 89A that is the lower end portion of the first positioning member 89R. The connection portion 89B has a substantially rectangular and tabular shape in plan view that extends in the front-rear direction.

The second positioning member 89L has the same structure as that of the first positioning member 89R except that the left and right of the second positioning member 89L are opposite to those of the first positioning member 89R. In other words, the four positioning recesses 93 included in the first positioning member 89R and the four positioning recesses 93 included in the second positioning member 89L are configured to coincide with each other when viewed in the left-right direction.

Furthermore, the first positioning member 89R is supported by the connection plate 88 when the connection portion 89B is connected to the right end portion of the connection plate 88. The second positioning member 89L is supported by the connection plate 88 when the connection portion 89B is connected to the left end portion of the connection plate 88. In other words, the first positioning member 89R, the second positioning member 89L, and the exposure unit 11 are connected to each other through the connection plate 88.

Furthermore, in a state in which the process cartridges 14 are in the engagement position, the positioning recesses 93 receive the lower end portions of the engagement portions 52 of the process cartridges 14 and are in contact with the lower end portions of the engagement portion 52 from below. With the above, the second portion 20B of each first flange 20R engages with the corresponding positioning recess 93 of the first positioning member 89R through the corresponding engagement portion 52, and the second portion 20B of each second flange 20L engages with the corresponding positioning recess 93 of the second positioning member 89L through the corresponding engagement portion 52. Accordingly, the photosensitive drums 18 are positioned by the first positioning member 89R and the second positioning member 89L.

(4) Guide Rails

The first guide rail 94R is disposed at the right end portion of the body casing 2. The second guide rail 94L is disposed at the left end portion of the body casing 2. In other words, the first guide rail 94R and the second guide rail 94L are disposed so as to be spaced apart from each other in the left-right direction and are disposed so as to coincide with each other when viewed in the left-right direction.

The first guide rail 94R is disposed below the engagement portions 52 of the first sidewalls 48R of the process cartridges 14 so as to be spaced apart therefrom and is fixed to the left surface of the body portion 89A of the first positioning member 89R.

The first guide rail 94R has a substantially prismatic shape that extends in the front-rear direction and includes a guide groove 95 and two guide rollers 96.

The guide groove 95 has a substantially recessed shape open towards the left and is recessed from the left surface of the first guide rail 94R towards the right. As illustrated in FIG. 1, the guide groove 95 extends across substantially the entire first guide rail 94R in the front-rear direction. The rear end portion of the guide groove 95 is closed and the front end portion of the guide groove 95 is open.

On the lower side of the front end portion of the guide groove 95, the two guide rollers 96 are disposed so as to be aligned in the front-rear direction. Each guide roller 96 is capable of rotating about an axis that extends in the left-right direction, and the upper end portion of each guide roller 96 is exposed from the lower side of the guide groove 95.

Furthermore, the guide groove 95 of the first guide rail 94R receives the right portion of the first side frame 68R of the drawer 15 so as to allow the first side frame 68R to slide in the front-rear direction.

The second guide rail 94L has the same structure as that of the first guide rail 94R except that the left and right of the second guide rail 94L are opposite to those of the first guide rail 94R.

5. Drive Unit and Power Supply Unit

The image forming unit 3 includes a drive unit 8 and the power supply unit 9.

(1) Drive Unit

The drive unit 8 is configured to input driving power to the four photosensitive drums 18 and, as illustrated in FIG. 4, is disposed on the right surface of the first inner wall 85R. As illustrated in FIG. 6, the drive unit 8 includes a frame 86, a drive cam 99, four drive input members 98, and a compression spring 100.

Figure 11:
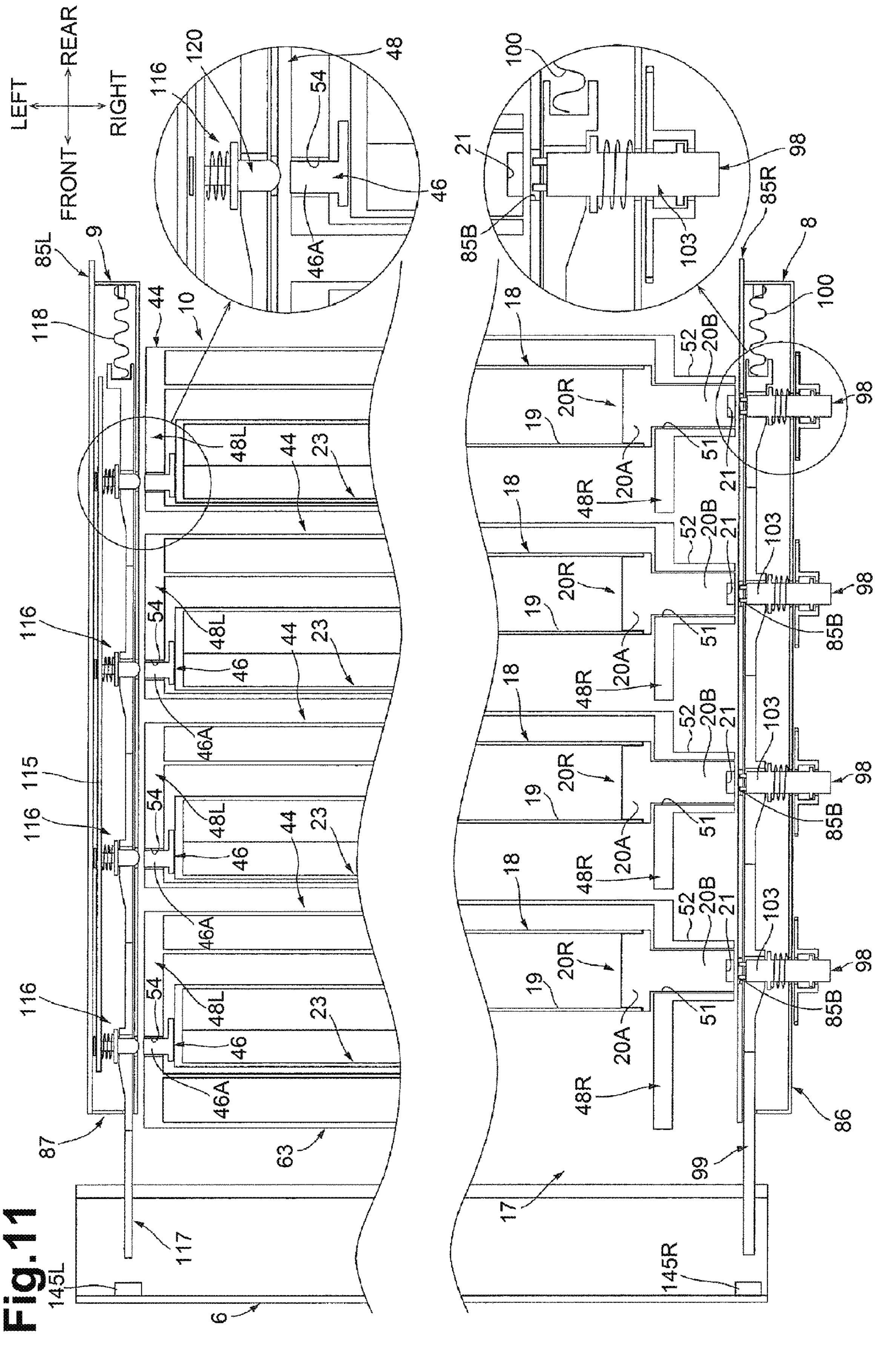
FIG. 11 is a cross-sectional view of the image forming apparatus illustrated in FIG. 7 and corresponds to the cross-sectional view of FIG. 4 taken along line C-C.

The frame 86 is supported by the first inner wall 85R. The drive cam 99 is accommodated inside the frame 86. The drive cam 99 is capable of moving in the front-rear direction between a pressing position (see FIG. 11) that presses the four drive input members 98 rightwards and a pressing release position (see FIG. 6) that releases the pressing action pressing the four drive input members 98. Note that in a state in which the front cover 6 is in the closed position, when the front end portion of the drive cam 99 is abutted against a first cam abutment portion 145R (described later) of the front cover 6, the drive cam 99 is pressed towards the rear and is positioned at the pressing release position.

The drive input members 98 include drive couplings 103 that are capable of moving in the left-right direction between a drive transmitting position (see FIG. 6) in which the drive couplings 103 are engaged with the coupling recesses 21 of the photosensitive drums 18, and a drive transmission releasing position (see FIG. 11) in which the engagement between the drive couplings 103 and the coupling recesses 21 of the photosensitive drums 18 are released. The compression spring 100 normally biases the drive cam 99 towards the front to bias the drive cam 99 towards the pressing position.

(2) Power Supply Unit

The power supply unit 9 is configured to supply electric power to the four development units 29 and, as illustrated in FIG. 4, is disposed on the right surface of the second inner wall 85L. As illustrated in FIG. 6, the power supply unit 9 includes a frame 87, a substrate 115, a power feed cam 117, four power feed members 116, and a compression spring 118.

The frame 87 is supported by the second inner wall 85L. The substrate 115 is configured to feed power to the four power feed members 116. The power feed cam 117 is capable of moving in the front-rear direction between a pressing position (see FIG. 11) that presses the power feed member 116 leftwards and a pressing release position (see FIG. 6) that releases the pressing action pressing the power feed member 116. Note that in a state in which the front cover 6 is in the closed position, when the front end portion of the power feed cam 117 is abutted against a second cam abutment portion 145L (described later) of the front cover 6, the power feed cam 117 is pressed towards the rear and is positioned at the pressing release position.

The power feed member 116 includes main body electrodes 120 that are capable of moving in the left-right direction between a conduction position (see FIG. 6) in which the main body electrodes 120 are in contact with the electric contacts 46A of the development units 29, and a conduction releasing position (see FIG. 11) in which contacts between the main body electrodes 120 and the electric contacts 46A of the development units 29 are released. The compression spring 118 normally biases the power feed cam 117 towards the front to bias the power feed cam 117 towards the pressing position.

6. Belt Unit and Front Cover

As illustrated in FIG. 4, the belt unit 30 includes a belt frame 130. The belt frame 130 includes a first sidewall 133R and a second sidewall 133L. The first sidewall 133R disposed on the right end portion of the belt frame 130. The second sidewall 133L is disposed on the left end portion of the belt frame 130. In other words, the first sidewall 133R and the second sidewall 133L are disposed so as to be spaced away from each other in the left-right direction.

The first sidewall 133R and the second sidewall 133L each have a substantially rectangular and tabular shape in side view that extends in the front-rear direction. Note that, between the first sidewall 133R and the second sidewall 133L, the belt frame 130 supports the driving roller 32, the driven roller 33, the intermediate transfer belt 34, the four primary transfer rollers 35, and the opposite roller 36.

As illustrated in FIGS. 1 and 6, the front cover 6 has a substantially rectangular and tabular shape in front of you that extends in the up-down and left-right direction. The front cover 6 includes the first cam abutment portion 145R, the second cam abutment portion 145L, a first press abutment portion 146R, a second press abutment portion 146L, a first drawer abutment portion 147R, and a second drawer abutment portion 147L.

As illustrated in FIG. 6, the first cam abutment portion 145R and the second cam abutment portion 145L are disposed at substantially the middle portion of the back surface of the front cover 6 in the up-down direction so as to be spaced apart with each other in the left-right direction. The first cam abutment portion 145R and the second cam abutment portion 145L each have a substantially trapezoidal shape in side view that is tapered towards the rear side and protrude towards the rear side from the front cover 6.

As illustrated in FIGS. 1 and 5, the first press abutment portion 146R and the second press abutment portion 146L are disposed at the upper portion of the back surface of the front cover 6 so as to be spaced apart in the left-right direction. The first press abutment portion 146R and the second press abutment portion 146L each have a substantially trapezoidal shape in side view that is tapered towards the rear side and protrude towards the rear side from the front cover 6.

The first drawer abutment portion 147R and the second drawer abutment portion 147L are disposed at substantially the middle portion of the back surface of the front cover 6 in the up-down direction so as to be spaced apart with each other in the left-right direction. The first drawer abutment portion 147R and the second drawer abutment portion 147L are tapered towards the rear side and protrude from the front cover 6.

Note that the front cover 6 also supports a third connection portion 150R and a fourth connection portion 150L of an interlocking mechanism 148, which will be described in detail later.

7. Pressing Mechanism

Figure 3:
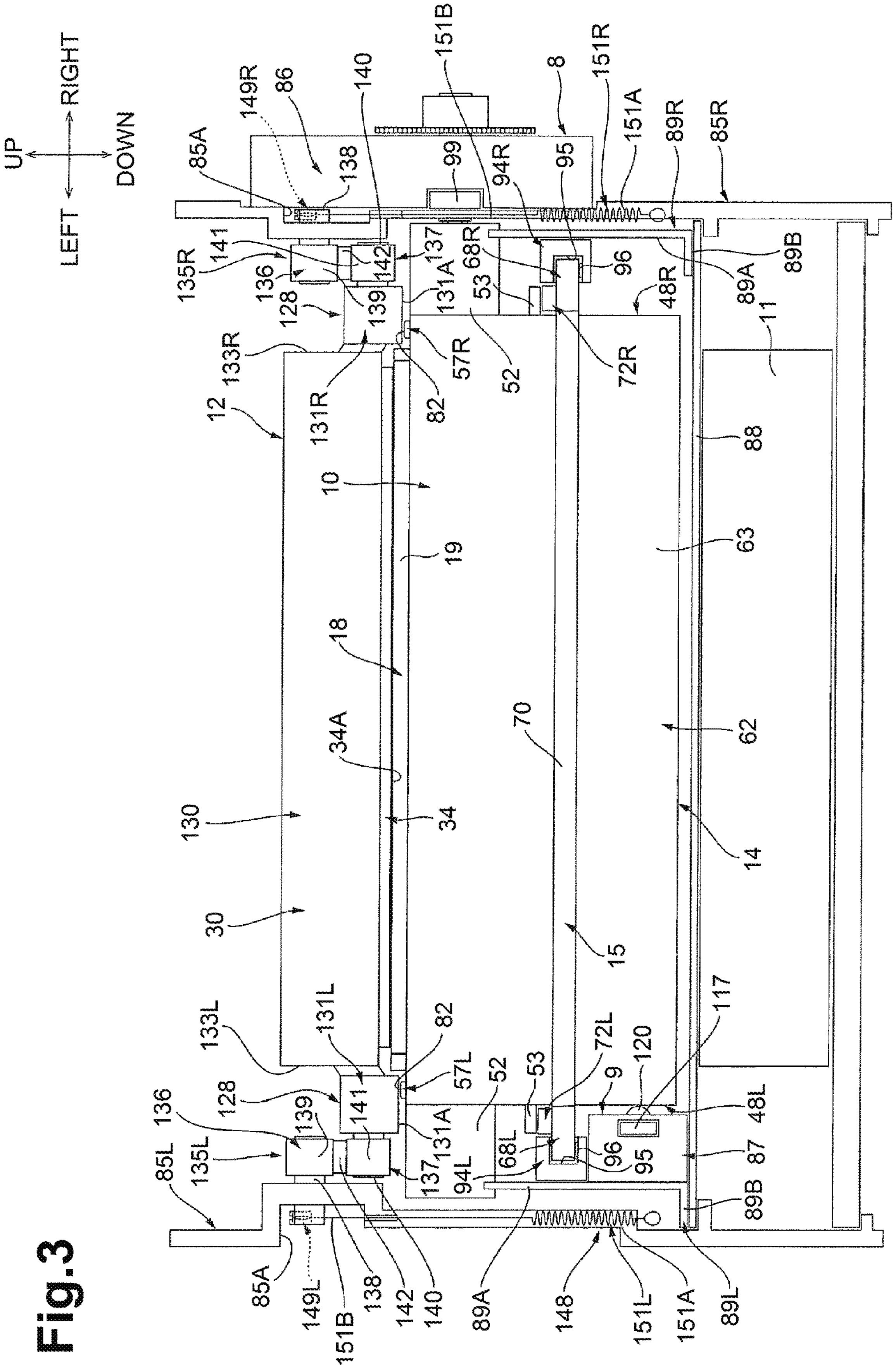
FIG. 3 is a front view of the image forming apparatus illustrated in FIG. 1 and illustrates a state in which the front cover has been removed.

As illustrated in FIG. 3, the image forming apparatus 1 includes a pressing mechanism 128 and the interlocking mechanism 148.

The pressing mechanism 128 is configured to press the first press units 57R and the second press units 57L of the four process cartridges 14, and includes the first pressing member 131R, a second pressing member 131L, two first pivoting units 135R, and two second pivoting units 135L.

(1) Pressing Member

The first pressing member 131R and the second pressing member 131L are provided inside the body casing 2 and are disposed so as to be spaced apart from each other in the left-right direction having the belt unit 30 in between. The first pressing member 131R is disposed on the right side with respect to the first sidewall 133R of the belt unit 30 and the upper portion of the first pressing member 131R is connected to the lower portion of the right surface of the first sidewall 133R. The second pressing member 131L is disposed on the left side with respect to the second sidewall 133L of the belt unit 30 and the upper portion of the second pressing member 131L is connected to the lower portion of the left surface of the second sidewall 133L. With the above, the first pressing member 131R and the second pressing member 131L are integrally configured with the belt frame 130.

As illustrated in FIG. 5, the first pressing member 131R and the second pressing member 131L each have a substantially bar shape that extends in the front-rear direction, more specifically, a substantially prismatic shape extending in the front-rear direction.

Figure 10:
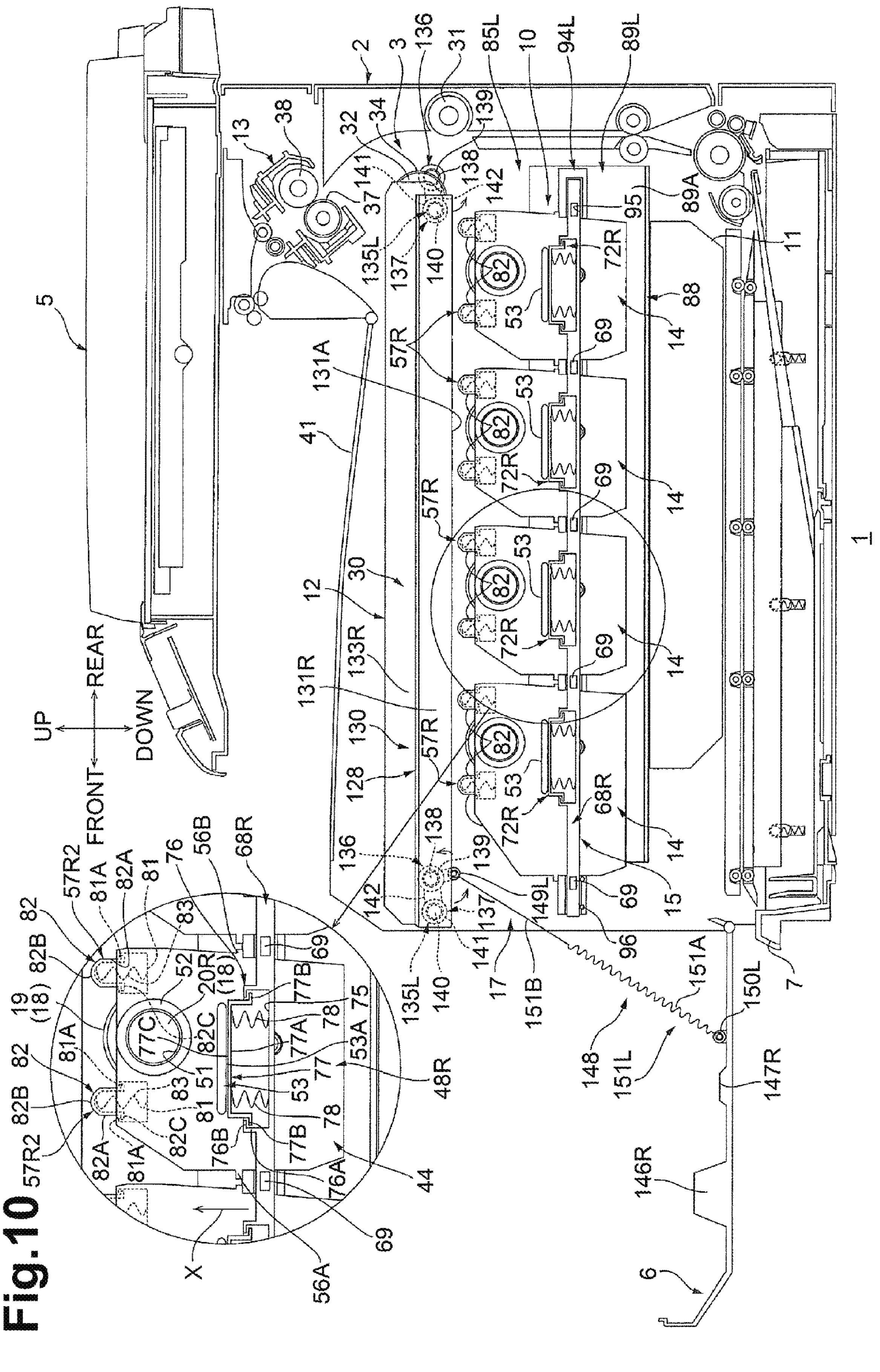
FIG. 10 is a cross-sectional view of the image forming apparatus illustrated in FIG. 7 and corresponds to the cross-sectional view of FIG. 4 taken along line B-B.

As illustrated in FIG. 10, the front end portions of the first pressing member 131R and the second pressing member 131L are positioned slightly in front of the front end portion of the first sidewall 133R of the belt unit 30. Furthermore, as illustrated in FIG. 3, the undersides of the first pressing member 131R and the second pressing member 131L are configured as abutment surfaces 131A. The abutment surfaces 131A are provided below a transfer surface 34A of the intermediate transfer belt 34, in other words, the abutment surfaces 131A are disposed on the process cartridges 14 side so as to be closer to the exposure unit 11.

(2) Pivoting Unit

The two first pivoting units 135R are disposed on the right side with respect to the first pressing member 131R. The two second pivoting units 135L are disposed on the left side with respect to the second pressing member 131L. In other words, the belt unit 30, the first pressing member 131R, the second pressing member 131L, the two first pivoting units 135R, and the two second pivoting units 135L are arranged so as to be aligned in the left-right direction.

Among the two first pivoting units 135R, the first pivoting unit 135R at the front corresponds to the front end portion of the first pressing member 131R and, among the two first pivoting units 135R, the first pivoting unit 135R at the rear corresponds to the rear end portion of the first pressing member 131R. In other words, the two first pivoting units 135R are disposed so as to be spaced away from each other in the front-rear direction. As illustrated in FIGS. 3 and 5, each first pivoting unit 135R includes a fulcrum portion 136 and a press connection 137.

The fulcrum portion 136 is disposed on the left side with respect to the recess 85A of the first inner wall 85R and includes a fulcrum shaft 138 and a first cylindrical portion 139. The fulcrum shaft 138 has a substantially columnar shape extending in the left-right direction. Furthermore, the fulcrum shaft 138 is rotatably supported by the first inner wall 85R so as to protrude towards the left side from the recess 85A of the first inner wall 85R. The first cylindrical portion 139 has a substantially cylindrical shape that extends in the left-right direction. Furthermore, the first cylindrical portion 139 is attached to the fulcrum shaft 138 in a relatively non-rotatable manner at the left side of the first inner wall 85R.

The press connection 137 connects the fulcrum portion 136 and the first pressing member 131R, and is disposed below the fulcrum portion 136. The press connection 137 includes a connection shaft 140, a second cylindrical portion 141, and a continuous portion 142. The connection shaft 140 has a substantially columnar shape extending in the left-right direction. Furthermore, the connection shaft 140 is fixed in a relatively rotatable manner to the first pressing member 131R so as to protrude to the right side from the right surface of the first pressing member 131R. The second cylindrical portion 141 has a substantially cylindrical shape that extends in the left-right direction and is attached to the connection shaft 140 in a relatively non-rotatable manner. The continuous portion 142 connects the first cylindrical portion 139 and the second cylindrical portion 141 to each other, and extends upwards from the upper end portion of the second cylindrical portion 141 and is connected to the lower end portion of the first cylindrical portion 139.

Each second pivoting unit 135L has the same structure as that of the first pivoting unit 135R except that the left and right of each second pivoting unit 135L are opposite to those of the first pivoting unit 135R.

Note that the fulcrum shaft 138 of the first pivoting unit 135R at the front, among the first pivoting units 135R, penetrates the first inner wall 85R in the left-right direction. Note that the fulcrum shaft 138 of the second pivoting unit 135L at the front, among the second pivoting units 135L, penetrates the second inner wall 85L in the left-right direction. The right side portion of the fulcrum shaft 138 penetrating the first inner wall 85R is disposed inside the recess 85A. Furthermore, the right side portion of the fulcrum shaft 138 disposed inside the recess 85A supports a first connection portion 149R of the interlocking mechanism 148 described later. Furthermore, the left side portion of the fulcrum shaft 138 penetrating the second inner wall 85L is disposed inside the recess 85A. Furthermore, the left side portion of the fulcrum shaft 138 disposed inside the recess 85A supports a second connection portion 149L of the interlocking mechanism 148 described later.

(3) Operation of Pressing Mechanism

The first pressing member 131R, the second pressing member 131L, and the belt unit 30 are configured so as to be capable of moving in an integrated manner with the two first pivoting units 135R and the two second pivoting units 135L.

In detail, the first pressing member 131R is configured to move between an abutment position (see FIG. 5) in which the first pressing member 131R abuts against the first press units 57R of the process cartridges 14 from the belt unit 30 side, in other words, from above, and an abutment released position (see FIG. 10) in which the abutment against the first press units 57R is released. Furthermore, the second pressing member 131L is configured to move between an abutment position (see FIG. 5) in which the second pressing member 131L abuts against the second press units 57L of the process cartridges 14 from the belt unit 30 side, in other words, from above, and an abutment released position (see FIG. 10) in which the abutment against the second press units 57L is released.

Furthermore, interlocking with the movement of the first pressing member 131R from the abutment position to the abutment released position and the movement of the second pressing member 131L from the abutment position to the abutment released position, the belt unit 30 moves from a contact position (see FIG. 1) in which the transfer surface 34A of the intermediate transfer belt 34 is in contact with the four photosensitive drums 18 to a separated position (see FIG. 7) in which the transfer surface 34A of the intermediate transfer belt 34 is separated from the four photosensitive drums 18, and interlocking with the movement of the first pressing member 131R from the abutment released position to the abutment position and the movement of the second pressing member 131L from the abutment released position to the abutment position, the belt unit 30 moves from the separated position (see FIG. 7) to the contact position (see FIG. 1). In other words, the belt unit 30 is configured to move between the contact position (see FIG. 1) and the separated position (see FIG. 7).

Note that as illustrated in FIG. 5, in a state in which the front cover 6 is positioned in the closed position, by having the front end portion of the first pressing member 131R abut against the first press abutment portion 146R, the first pressing member 131R is pressed towards the rear side and becomes positioned in the abutment position. As illustrated in FIG. 1, in a state in which the front cover 6 is positioned in the closed position, by having the front end portion of the second pressing member 131L abut against the second press abutment portion 146L, the second pressing member 131L is pressed towards the rear side and becomes positioned in the abutment position. Accordingly, when the front cover 6 is positioned in the closed position, the belt unit 30 is positioned in the contact position.

8. Interlocking Mechanism

Although described later, the interlocking mechanism 148 is configured to interlock the movement of the front cover 6 with the first pressing member 131R and the second pressing member 131L. The interlocking mechanism 148 includes the first connection portion 149R, the second connection portion 149L, the third connection portion 150R, the fourth connection portion 150L, a first connection member 151R, and a second connection member 151L.

As illustrated in FIG. 3, the first connection portion 149R is provided so as to correspond to, among the two first pivoting units 135R, the first pivoting unit 135R at the front. The second connection portion 149L is provided so as to correspond to, among the two second pivoting units 135L, the second pivoting unit 135L at the front.

As illustrated in FIGS. 3 and 5, the first connection portion 149R is disposed on the right rear side of the fulcrum shaft 138 that is disposed inside the recess 85A of the first inner wall 85R. The first connection portion 149R has a substantially rectangular tabular shape in side view and extends towards the rear side from the right side portion of the fulcrum shaft 138. In other words, the first connection portion 149R is disposed so as to be spaced apart and positioned at, in the circumferential direction of the fulcrum shaft 138, substantially 90° with respect to the continuous portion 142 in the counterclockwise direction when viewed from the right side.

The second connection portion 149L has the same structure as that of the first connection portion 149R except that the left and right of the second connection portion 149L are opposite to those of the first connection portion 149R.

As illustrated in FIGS. 1 and 5, the third connection portion 150R and the fourth connection portion 150L are provided on the front cover 6. The third connection portion 150R and the fourth connection portion 150L are provided on the back surface of the front cover 6 and below the first drawer abutment portion 147R and the second drawer abutment portion 147L, and are disposed so as to be spaced apart from each other in the left-right direction. The third connection portion 150R and the fourth connection portion 150L each have a substantially rectangular tabular shape in side view and each protrude towards the rear side from the back surface of the front cover 6.

As illustrated in FIGS. 3 and 5, the first connection member 151R and the second connection member 151L are disposed so as to be spaced apart from each other in the left-right direction. The first connection member 151R is formed of a wire rod and extends in a direction connecting the front lower portion and the rear upper portion. The first connection member 151R includes a coil portion 151A and a straight portion 151B.

The coil portion 151A is a lower front portion of the first connection member 151R and has a coil shape formed of a helically wound wire rod. The straight portion 151B is an upper rear portion of the first connection member 151R and extends continuously from the upper end portion of the coil portion 151A towards the upper rear direction in a straight manner.

Furthermore, the upper rear end portion of the first connection member 151R is locked to the rear end portion of the first connection portion 149R, and the lower front end portion of the first connection member 151R is locked to the rear end portion of the third connection portion 150R.

The second connection member 151L has the same structure as that of the first connection member 151R except that the left and right of the second connection member 151L are opposite to those of the first connection member 151R.

9. Dismounting Operation and Mounting Operation of Process Cartridges (1) Dismounting Operation A dismounting operation of the process cartridges 14 will be described.

As illustrated in FIGS. 5 and 10, when the user dismounts the process cartridges 14 from the body casing 2, the front cover 6 is moved from the closed position to the open position. With the above, abutment between the first pressing member 131R and the first press abutment portion 146R and abutment between the second pressing member 131L and the second press abutment portion 146L are released and, upon movement of the front cover 6, the third connection portion 150R and the fourth connection portion 150L of the interlocking mechanism 148 are moved forward and downward. With the above, the coil portion 151A of the first connection member 151R and the coil portion 151A of the second connection member 151L are extended longer than the natural lengths thereof.

Figure 7:
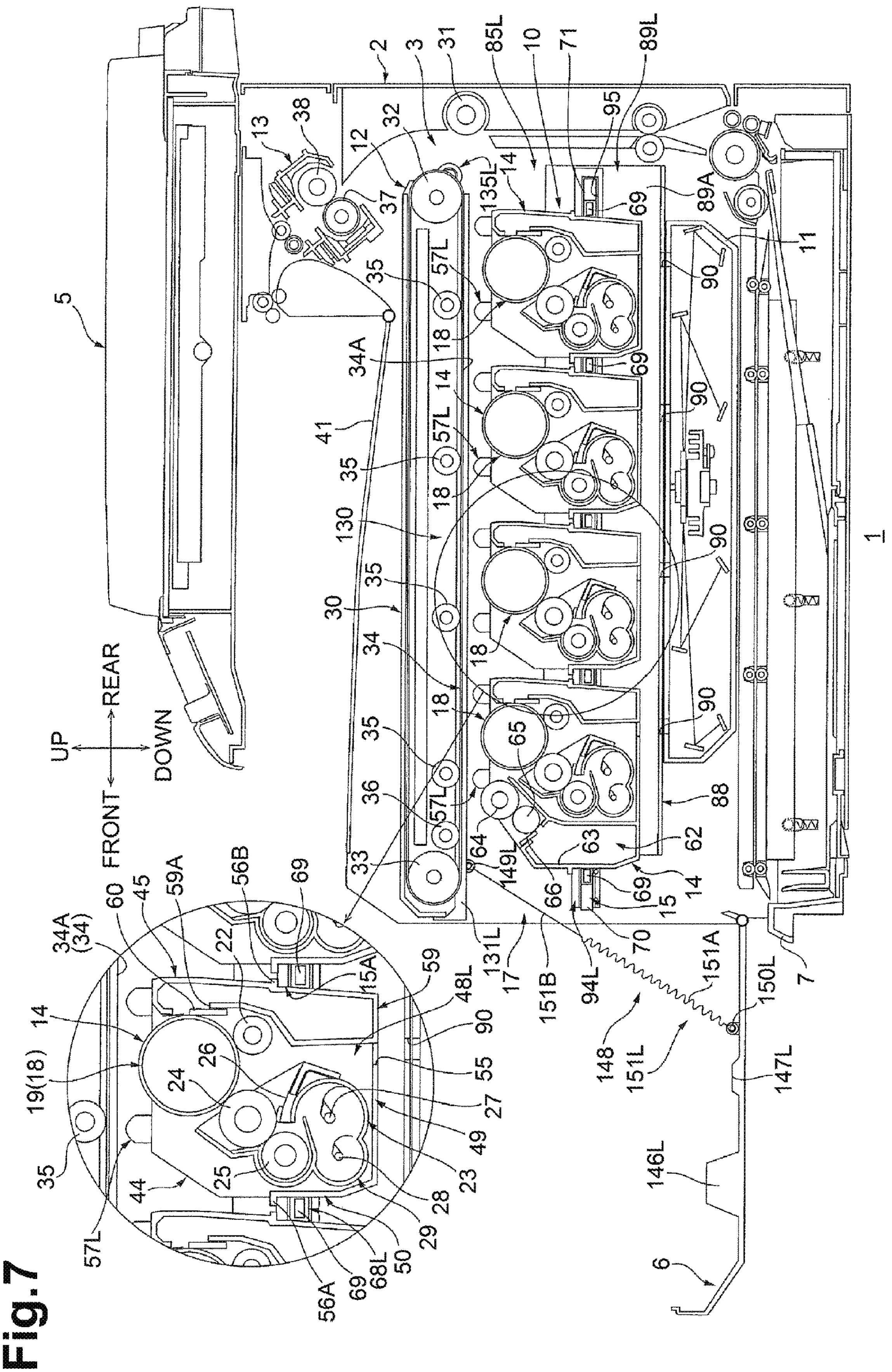
FIG. 7 is a center cross-sectional view of the exemplary embodiment of the image forming apparatus illustrated in FIG. 1 and illustrates a state in which the front cover is positioned in the open position and the drawer is positioned in the inside position.
Figure 8:
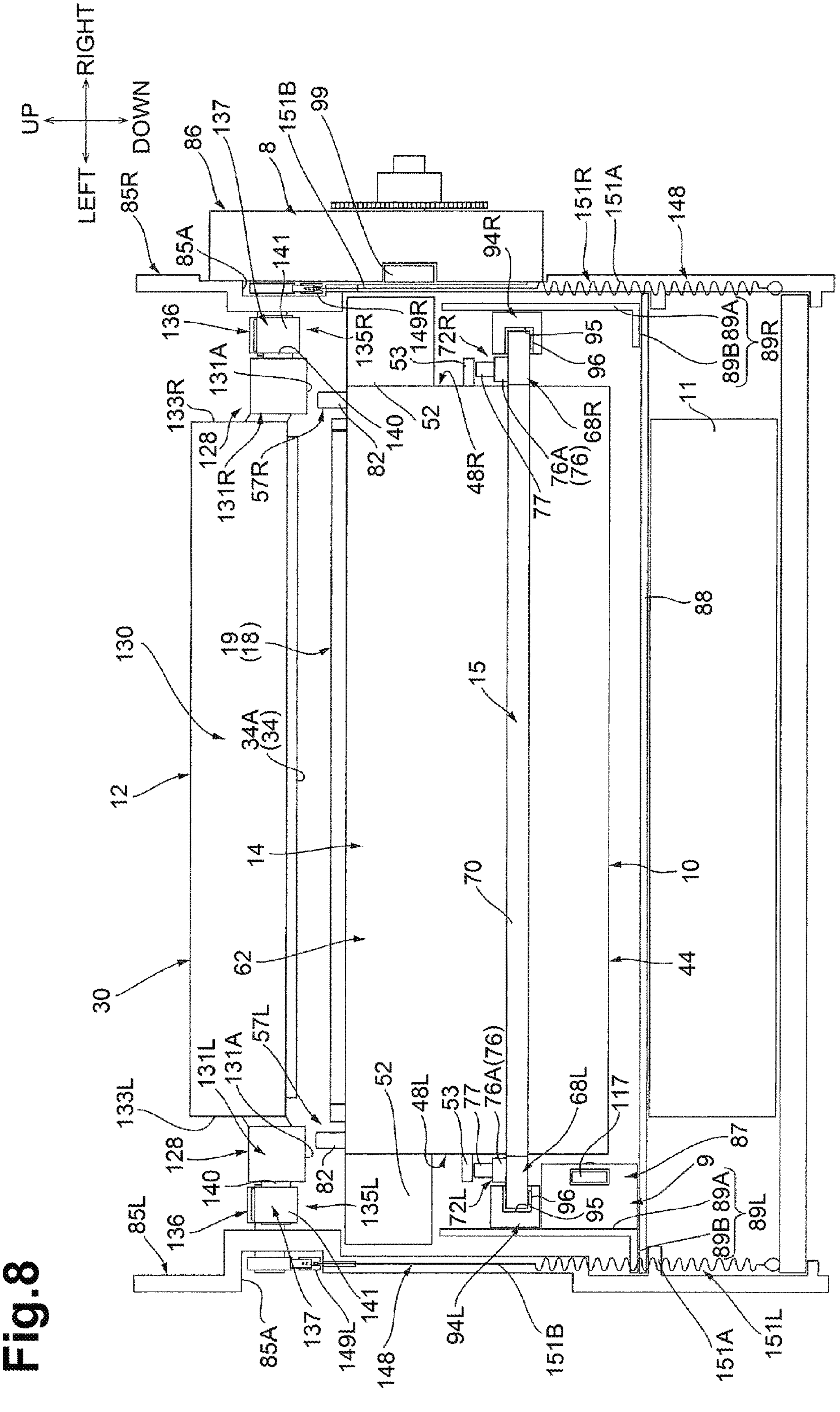
FIG. 8 is a front view of the image forming apparatus illustrated in FIG. 7 and illustrates a state in which the front cover has been removed.

Subsequently, when the front cover 6 reaches the open position, the first connection portion 149R is pulled forward and downward with the biasing force of the coil portion 151A of the first connection member 151R, and the second connection portion 149L is pulled forward and downward by the biasing force of the coil portion 151A of the second connection member 151L. With the above, the two first pivoting units 135R and the two second pivoting units 135L are, when viewed from the right side, each pivoted 90° in the clockwise direction about the corresponding fulcrum shaft 138 serving as the pivotal center. Then, the press connections 137 move forward and upwards and, as illustrated in FIG. 10, move in front of the fulcrum portions 136. With the above, the two front and rear end portions of the first pressing member 131R are pulled up and forward by the press connections 137, and the two front and rear end portions of the second pressing member 131L are pulled up and forward by the press connections 137. With the above, the first pressing member 131R moves forward and upwards in a parallel manner from the abutment position reaching the abutment released position in which the abutment surface 131A becomes separated from the two abutted portions 82 of each first press unit 57R. Furthermore, the second pressing member 131L moves forward and upwards in a parallel manner from the abutment position reaching the abutment released position in which the abutment surface 131A becomes separated from the two abutted portions 82 of each second press unit 57L. Subsequently, as illustrated in FIG. 7, the belt unit 30 moves forward and upwards in a parallel manner from the contact position and reaches the separated position in which the transfer surface 34A of the intermediate transfer belt 34 is separated from the four photosensitive drums 18.

In other words, interlocking with the front cover 6 moving from the closed position to the open position, the first pressing member 131R and the second pressing member 131L move from the abutment position to the abutment released position, and interlocking with the front cover 6 moving from the closed position to the open position, the belt unit 30 moves from the contact position to the separated position.

Furthermore, as illustrated in FIG. 10, when the first pressing member 131R moves from the abutment position to the abutment released position, the two abutted portions 82 of each first press unit 57R are moved upwards from the retreat position to the advance position with the biasing force of the corresponding two biasing members 83 of the first press unit 57R. Furthermore, when the second pressing member 131L moves from the abutment position to the abutment released position, the two abutted portions 82 of each second press unit 57L are moved upwards from the retreat position to the advance position with the biasing force of the two biasing members 83 of the second press units 57L.

With the biasing force of the two biasing members 78, the contact portion 77A of the advancing/retreating portion 77 of each first biasing portion 72R of the drawer 15 biases the projection 53 of the first sidewall 48R of the corresponding process cartridge 14 upwards. Furthermore, with the biasing force of the two biasing members 78, the contact portion 77A of the advancing/retreating portion 77 of each second biasing portion 72L of the drawer 15 biases the projection 53 of the second sidewall 48L of the corresponding process cartridge 14 upwards. With the above, each process cartridge 14 moves upwards from the engagement position to the disengagement position in a uniform manner in the left-right direction.

In the above case, the two restriction portions 77B of each advancing/retreating portion 77 that have been guided by the frame portions 76A are restricted from moving further upwards by the two restricting protrusions 76B. With the above, the amount of movement of the contact portion 77A of each advancing/retreating portion 77 in the front-rear direction becomes uniform when each process cartridge 14 is moved from the engagement position to the disengagement position.

Figure 9:
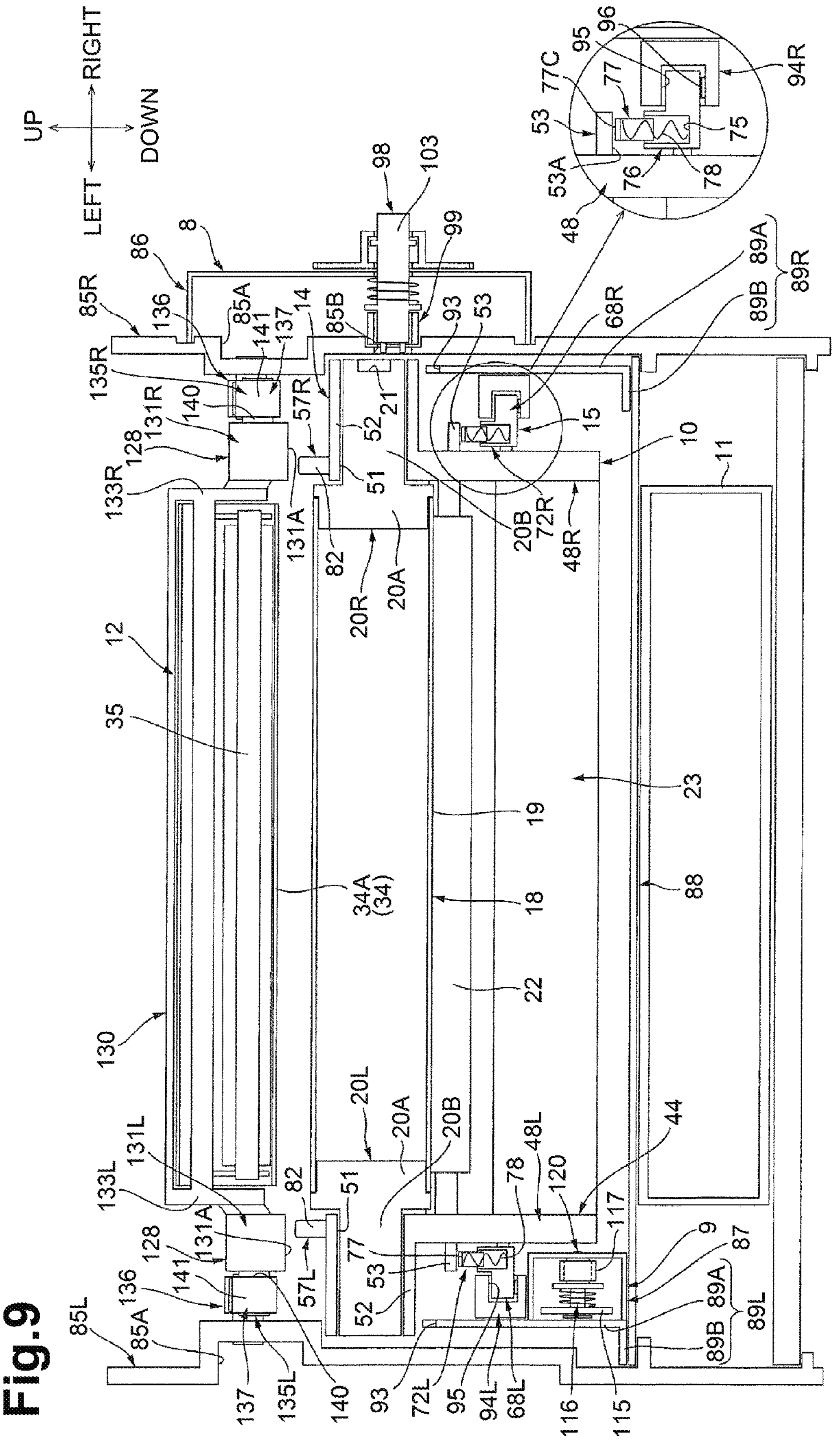
FIG. 9 is a cross-sectional view of the image forming apparatus illustrated in FIG. 7 and corresponds to the cross-sectional view of FIG. 1 taken along line A-A.

Subsequently, when the process cartridges 14 reach the disengagement position, as illustrated in FIG. 9, the engagement portions 52 are separated upwards from the positioning recesses 93. With the above, the engagement between the first flange 20R of each photosensitive drum 18 and the corresponding positioning recess 93 of the first positioning member 89R, which are engaged through the corresponding engagement portion 52, is released, and the engagement between the second flange 20L of each photosensitive drum 18 and the corresponding positioning recess 93 of the second positioning member 89L, which are engaged through the corresponding engagement portion 52, is released. In other words, when the first pressing member 131R and the second pressing member 131L are in the abutment released position, the contact portions 77A of the advancing/retreating portions 77 move the process cartridges 14 from the engagement position to the disengagement position.

Furthermore, in a state in which the first pressing member 131R and the second pressing member 131L are in the abutment released position, the process cartridges 14 are in the disengagement position, and the abutted portions 82 are in the advance position, the first pressing member 131R and the two abutted portions 82 of each first press unit 57R are separated from each other in the up-down direction and the second pressing member 131L and the two abutted portions 82 of each second press unit 57L are separated from each other in the up-down direction.

In other words, the movement amount of the first pressing member 131R and the second pressing member 131L moving from the abutment position to the abutment released position is larger than the sum of the movement amount of the process cartridges 14 moving from the engagement position to the disengagement position and the movement amount of the abutted portions 82 moving from the retreat position to the advance position.

Subsequently, the drawer 15 by which the process cartridges 14 are supported is, as illustrated in FIG. 12, drawn out from the body casing 2 towards the front by the user. With the above, the first side frame 68R of the drawer 15 is guided by the first guide rail 94R and the second side frame 68L of the drawer 15 is guided by the second guide rail 94L, and the drawer 15 reaches the outside position. After the above, as illustrated in FIG. 12 with broken lines, the process cartridge 14 is dismounted upwards from the drawer 15 in the dismount direction X by the user.

With the above, dismounting of the process cartridges 14 from the body casing 2 is completed.

(2) Mounting Operation

A mounting operation of the process cartridges 14 will be described.

When mounting the process cartridges 14 on the body casing 2, the user inserts the process cartridges 14 into the insertion openings 15A of the drawer 15 from above. With the above, the process cartridges 14 are supported by the drawer 15.

Subsequently, as illustrated in FIGS. 5 and 10, the drawer 15 supporting the process cartridges 14 is pushed into the body casing 2. With the above, the first side frame 68R of the drawer 15 is guided by the first guide rail 94R and the second side frame 68L of the drawer 15 is guided by the second guide rail 94L, and the drawer 15 reaches the inside position. Subsequently, the front cover 6 is moved from the open position to the closed position.

Then, upon movement of the front cover 6 moving towards the closed position, the coil portion 151A of the first connection member 151R and the coil portion 151A of the second connection member 151L are compressed. With the above, the first connection portion 149R is pressed backwards and upwards with the biasing force of the coil portion 151A of the first connection member 151R, and the second connection portion 149L is pressed backwards and upwards by the biasing force of the coil portion 151A of the second connection member 151L. Furthermore, the first press abutment portion 146R of the front cover 6 abuts against the front end portion of the first pressing member 131R and presses the first pressing member 131R towards the rear side, and the second press abutment portion 146L abuts against the front end portion of the second pressing member 131L and presses the second pressing member 131L towards the rear side.

With the above, the two first pivoting units 135R and the two second pivoting units 135L are, when viewed from the right side, each pivoted 90° in the counterclockwise direction about the corresponding fulcrum shaft 138 serving as the pivotal center. Then, the press connections 137 move backwards and downwards and, as illustrated in FIG. 5, move behind of the fulcrum portions 136.

With the above, the first pressing member 131R and the second pressing member 131L are each pressed downwards and backwards with the corresponding press connections 137 and are moved from the abutment released position to the abutment position in a parallel manner. In other words, interlocking with the front cover 6 moving from the closed position to the open position, the first pressing member 131R and the second pressing member 131L move from the abutment position to the abutment released position.

Furthermore, when the first pressing member 131R reaches the abutment position, as illustrated in FIG. 4, the left side portion of the abutment surface 131A of the first pressing member 131R abuts against the arc portions 82B of the two abutted portions 82 of each first press unit 57R from above, and the right side portion of the abutment surface 131A of the second pressing member 131L abuts against the arc portions 82B of the two abutted portions 82 of each second press unit 57L from above. In other words, the two abutted portions 82 of each first press unit 57R positioned on the left side with respect to the right surface of the first pressing member 131R, and the two abutted portions 82 of each second press unit 57L is positioned in the right side respect to the left surface of the second pressing member 131L.

Furthermore, the first pressing member 131R presses the two abutted portions 82 of each first press unit 57R downwards, and the second pressing member 131L presses the two abutted portions 82 of each second press unit 57L downwards. With the above, the abutted portions 82 move downwards towards the retreat position from the advance position so as to be separated from the belt unit 30.

Then, as illustrated in FIG. 5, the biasing members 83 are compressed further and bias the bottom walls of the support frames 81 downwards. With the above, the process cartridges 14 countering the biasing force of the two biasing members 78 of each first biasing portion 72R and the biasing force of the two biasing members 78 of each second biasing portion 72L move downwards from the disengagement position towards the engagement position. In other words, when the first pressing member 131R and the second pressing member 131L are in the abutment position, the process cartridges 14 are disposed in the engagement position.

Furthermore, when the process cartridges 14 reach the engagement position, as illustrated in FIG. 4, the engagement portions 52 of the first sidewalls 48R engage with the positioning recesses 93 of the first positioning member 89R from above, and the engagement portions 52 of the second sidewalls 48L engage with the positioning recesses 93 of the second positioning member 89L from above. In other words, by having the pairs of abutted portions 82 be abutted (be pressed) against the first pressing member 131R, the two biasing members 83 of each first press unit 57R bias the engagement portions 52 of the first sidewalls 48R and the first flanges 20R of the photosensitive drums 18 towards the positioning recesses 93 of the first positioning member 89R. Furthermore, by having the pairs of abutted portions 82 be abutted (be pressed) against the second pressing member 131L, the two biasing members 83 of each second press unit 57L bias the engagement portions 52 of the second sidewalls 48L and the second flanges 20L of the photosensitive drums 18 towards the positioning recesses 93 of the second positioning member 89L. With the above, the engagement portions 52 are engaged with the positioning recesses 93 and are positioned by the first positioning member 89R and the second positioning member 89L.

Accordingly, the first flanges 20R of the photosensitive drums 18 are engaged with the positioning recesses 93 through the engagement portions 52 and are positioned with respect to the first positioning member 89R. Furthermore, the second flanges 20L are positioned in a similar manner to that of the first flanges 20R.

Furthermore, as illustrated in FIG. 1, associated with the movement of the first pressing member 131R and the second pressing member 131L from the abutment released position to the abutment position, the belt unit 30 moves backwards and downwards from the separated position towards the contact position in a parallel manner. With the above, the transfer surface 34A of the intermediate transfer belt 34 comes into contact with the four photosensitive drums 18 from above. In other words, interlocking with the movement of the front cover 6 moving from the closed position to the open position, the belt unit 30 moves from the contact position to the separated position.

10. Effects (1) As illustrated in FIG. 4, each process cartridge 14 includes the engagement portion 52 of the first sidewall 48R that engages with the first positioning member 89R, the engagement portion 52 of the second sidewall 48L that engages with the second positioning member 89L, the first press units 57R that press the engagement portion 52 of the first sidewall 48R towards the first positioning member 89R, and the second press units 57L that press the engagement portion 52 of the second sidewall 48L towards the second positioning member 89L. Accordingly, the positional relationship between the engagement portion 52 of the first sidewall 48R and the first press units 57R, and the positional relationship between the engagement portion 52 of the second sidewall 48L and the second press units 57L can be maintained in a uniform manner.

As a result, when the first pressing member 131R presses the first press units 57R, the first press units 57R can press the engagement portions 52 of the first sidewalls 48R towards the first positioning member 89R in a stable manner, and when the second pressing member 131L presses the second press units 57L, the second press units 57L can press the engagement portions 52 of the second sidewalls 48L towards the second positioning member 89L in a stable manner.

Accordingly, the engagement portions 52 of the first sidewalls 48R can be engaged with the first positioning member 89R in a reliable manner, and the engagement portions 52 of the second sidewalls 48L can be engaged with the second positioning member 89L in a reliable manner. With the above, positioning accuracy of the photosensitive drums 18 with respect to the body casing 2 can be improved.

(2) As illustrated in FIGS. 2B and 2C, each process cartridge 14 includes the first sidewall 48R and the second sidewall 48L. Furthermore, each first press unit 57R is fixed to the left surface of the corresponding first sidewall 48R, and each second press unit 57L is fixed to the right surface of the corresponding second sidewall 48L.

Accordingly, while having a simple configuration, the first press units 57R and the second press units 57L can be disposed in an efficient manner and the sizes of the process cartridges 14 in the left-right direction can be reduced.

(3) As illustrated in FIG. 2B, when viewed in the left-right direction, each first press unit 57R includes two pressed portions 57R2 that are disposed at an interval in the front-rear direction so as to have the corresponding photosensitive drum 18 in between. Furthermore, as illustrated in FIG. 2C, when viewed in the left-right direction, each second press unit 57L includes two pressed portions 57L2 that are disposed at an interval in the front-rear direction so as to have the corresponding photosensitive drum 18 in between.

Accordingly, as illustrated in FIG. 5, when the first pressing member 131R presses the first press units 57R, the first press units 57R press the pairs of pressed portions 57R2, each pair of pressed portions 57R2 being disposed at the right end portion of the corresponding process cartridge 14 so as to have the corresponding photosensitive drum 18 therebetween. Furthermore, when the second pressing member 131L presses the second press units 57L, the second press units 57L press the pairs of pressed portions 57L2, each pair of pressed portions 57L2 being disposed at the left end portion of the corresponding process cartridge 14 so as to have the corresponding photosensitive drum 18 therebetween.

Accordingly, at both sides of the photosensitive drums 18 in the front-rear direction, the engagement portions 52 of the first sidewalls 48R are pressed towards the first positioning member 89R, and the engagement portions 52 of the second sidewalls 48L are pressed towards the second positioning member 89L. As a result, as illustrated in FIG. 4, the engagement portions 52 of the first sidewalls 48R can be engaged with the first positioning member 89R in a reliable manner, and the engagement portions 52 of the second sidewalls 48L can be engaged with the second positioning member 89L in a reliable manner. With the above, positioning of the two left and right end portions of the photosensitive drums 18 can be performed reliably.

(4) As illustrated in FIG. 10, by disposing the first pressing member 131R in the abutment released position, the abutment between the first pressing member 131R and the process cartridges 14 is released, and by disposing the second pressing member 131L in the abutment cathode position, the abutment between the second pressing member 131L and the process cartridges 14 is released. Accordingly, as illustrated in FIG. 12, the drawer 15 supporting the process cartridges 14 can be moved smoothly between the inside position and the outside position.

(5) As illustrated in FIG. 9, the first biasing portions 72R bias the process cartridges 14 supported by the drawer 15 so that the engagement between the engagement portions 52 of the first sidewalls 48R and the first positioning member 89R is released. Furthermore, the second biasing portions 72L bias the process cartridges 14 supported by the drawer 15 so that the engagement between the engagement portions 52 of the second sidewalls 48L and the second positioning member 89L is released.

Accordingly, when the first pressing member 131R is in the abutment released position and the second pressing member 131L is in the abutment released position, the process cartridges 14 are disposed in the disengagement position. In other words, the first biasing portions 72R release the engagement between the engagement portions 52 of the first sidewalls 48R and the first positioning member 89R when the abutment between the first pressing member 131R and the first press units 57R is released. Furthermore, the second biasing portions 72L release the engagement between the engagement portions 52 of the second sidewall 48L and the second positioning member 89L when the abutment between the second pressing member 131L and the second press units 57L is released.

As a result, as illustrated in FIG. 12, when moving the drawer 15 supporting the process cartridges 14, by disposing the first pressing member 131R in the abutment released position, interference between the engagement portions 52 of the first sidewalls 48R and the first positioning member 89R can be suppressed, and by disposing the second pressing member 131L in the abutment released position, interference between the engagement portions 52 of the second sidewalls 48L and the second positioning member 89L can be suppressed.

Accordingly, the drawer 15 supporting the process cartridges 14 can be moved in a further smooth manner.

(6) As illustrated in FIG. 10, the first biasing portions 72R and the second biasing portions 72L each include the advancing/retreating portion 77 that is configured to advance and retreat in the up-down direction, and the advancing/retreating portion 77 includes the contact portion 77A and the two restriction portions 77B. Furthermore, the two restriction portions 77B restrict the movement of the contact portion 77A so that the amount of movement of the contact portion 77A is uniform in the front-rear direction. Accordingly, when the contact portions 77A move the process cartridges 14 from the engagement position to the disengagement position, the process cartridges 14 can be suppressed from tilting in the front-rear direction. As a result, the process cartridges 14 can be moved from the engagement position to the disengagement position in a stable manner.

(7) As illustrated in FIG. 5, the drawer 15 includes the accommodation recesses 75. Furthermore, the accommodation recesses 75 accommodate the advancing/retreating portions 77. Accordingly, while having a simple configuration, the advancing/retreating portions 77 can be disposed in an efficient manner.

(8) As illustrated in FIG. 9, since the first pressing member 131R and the belt unit 30 are integral and the second pressing member 131L and the belt unit 30 are integral, the first pressing member 131R and the belt unit 30 can be interlocked reliably and the second pressing member 131L and the belt unit 30 can be interlocked reliably. Accordingly, as illustrated in FIGS. 1 and 5, in a state in which the belt unit 30 is positioned in the contact position, the first pressing member 131R and the second pressing member 131L can be reliably disposed in the abutment position, and as illustrated in FIGS. 7 and 10, when the belt unit 30 is in the separated position, the first pressing member 131R and the second pressing member 131L can be reliably disposed in the abutment released position.

(9) As illustrated in FIGS. 5 and 10, the abutted portions 82 move between the advance position in the retreat position. Accordingly, as illustrated in FIG. 3, when the first pressing member 131R and the second pressing member 131L abut against the abutted portions 82, even if the first pressing member 131R and the second pressing member 131L are out from their predetermined positions, the abutted portions 82 can absorb the deviation of the first pressing member 131R and the second pressing member 131L.

Furthermore, as illustrated in FIG. 5, by having the first pressing member 131R abut against the abutted portions 82, the biasing members 83 of the first press units 57R bias the first flanges 20R of the photosensitive drums 18 towards the first positioning member 89R, and by having the second pressing member 131L abut against the abutted portions 82, the biasing members 83 of the second press units 57L bias the second flanges 20L of the photosensitive drums 18 towards the second positioning member 89L.

Accordingly, positioning accuracy of the photosensitive drums 18 with respect to the body casing 2 can be reliably improved.

(10) As illustrated in FIG. 9, the movement amount of the first pressing member 131R moving from the abutment position to the abutment released position is larger than the sum of the movement amount of the process cartridges 14 moving from the engagement position to the disengagement position and the movement amount of the abutted portions 82 of the first press units 57R moving from the retreat position to the advance position. Accordingly, when the first pressing member 131R is in the abutment released position, the first pressing member 131R and the abutted portions 82 of the first press units 57R can be separated reliably. As a result, as illustrated in FIG. 12, when the drawer 15 supporting the process cartridges 14 is moved, interference between the first pressing member 131R and the abutted portions 82 of the first press units 57R can be reliably suppressed.

(11) As illustrated in FIG. 2B, since each biasing member 83 is accommodated inside the corresponding cylindrical portion 82A so as to be in contact with the inner circumferential surface of the cylindrical portion 82A of the corresponding abutted portion 82, and as illustrated in FIG. 5, since the first pressing member 131R and the second pressing member 131L abut against the arc portions 82B of the abutted portions 82, the abutted portions 82 can be moved between the advance position and the retreat position in a reliable manner.

(12) As illustrated in FIG. 5, the first biasing portions 72R and the second biasing portions 72L include biasing members 78 that are compression springs. Accordingly, while having a simple configuration, in a state in which the first pressing member 131R is positioned in the abutment released position and the second pressing member 131L is positioned in the abutment released position, the process cartridges 14 can be reliably disposed in the disengagement position.

(13) As illustrated in FIG. 3, the first pressing member 131R and the second pressing member 131L are disposed so as to be arranged in the left-right direction with respect to the belt unit 30. Accordingly, the first pressing member 131R, the second pressing member 131L, and the belt unit 30 can be disposed in an efficient manner.

(14) As illustrated in FIG. 9, the abutment surface 131A of the first pressing member 131R and the abutment surface 131A of the second pressing member 131L are disposed on the process cartridges 14 side with respect to the underside 34A of the intermediate transfer belt 34 of the belt unit 30. Accordingly, as illustrated in FIG. 3, in a state in which the first pressing member 131R is positioned in the abutment position, the abutment surface 131A can be abutted against the first press units 57R in a reliable manner, and in a state in which the second pressing member 131L is positioned in the abutment position, the abutment surface 131A can be abutted against the second press units 57L in a reliable manner.

(15) As illustrated in FIG. 1, the belt unit 30 is disposed above the process cartridges 14. Accordingly, when the belt unit 30 is in the contact position, with the weight of the belt unit 30 itself, the intermediate transfer belt 34 of the belt unit 30 and the photosensitive drums 18 can be in contact with each other in a stable manner.

(16) As illustrated in FIGS. 1 and 7, the front cover 6 and the belt unit 30 interlocks with each other. Accordingly, when the front cover 6 is positioned in the closed position, the belt unit 30 can be reliably disposed in the contact position, and when the front cover 6 is positioned in the open position, the belt unit 30 can be reliably disposed in the separated position.

11. Other Modifications

In the exemplary embodiment described above, as an example of the process cartridge, the process cartridge 14 that include the photosensitive drum 18 and the development unit 29 in an integrated manner has been given; however, the process cartridge may be a process cartridge including a drum unit having a photosensitive drum and a development unit that is attachable/detachable with respect to the drum unit.

The above modification can also exert effects that are similar to the effects of the exemplary embodiment described above. Note that the exemplary embodiment described above and the modification may be combined as appropriate.

Note that the left-right direction is an axis direction, the up-down direction is a first direction, and the front-rear direction is a sliding direction.

What is claimed is:

1. An image forming apparatus comprising:

a body casing having an opening;

a cover configured to move between an open position in which the opening is opened and a closed position in which the opening is closed;

a plurality of process cartridges, each of which is configured to be detachably attached to the image forming apparatus through the opening, each of the plurality of process cartridges including a photosensitive drum with a rotational axis in a first direction, the plurality of process cartridges being arranged in a second direction perpendicular to the first direction;

a drawer configured to support the plurality of process cartridges and to move in the second direction; and a belt unit including a belt and configured to move between a contact position in which the belt is in contact with the photosensitive drum and a separated position in which the belt is separated from the photosensitive drum, wherein the belt unit is configured to move from the contact position to the separated position when the cover moves from the closed position to the open position.

2. The image forming apparatus according to claim 1, wherein each of the plurality of process cartridges includes: a cartridge frame; and a first sidewall and a second sidewall supporting each end of the photosensitive drum in the first direction, each of the first sidewall and the second sidewall has a biased portion, and the plurality of process cartridges are arranged in the second direction, wherein the drawer includes a first biasing portion and a second biasing portion at each end thereof in the first direction, and each of the first biasing portion and the second biasing portion has a biasing member and a contact portion in contact with the biasing member, and wherein the contact portion biases the biased portion with the biasing force of the biasing member in a third direction perpendicular to the first direction and the second direction.

3. The image forming apparatus according to claim 2, wherein the biased portion protrudes outward in the first direction.

4. The image forming apparatus according to claim 2, wherein the contact portion biases the biased portion toward the belt with the biasing force of the biasing member.

5. The image forming apparatus according to claim 2, wherein the contact portion biases the biased portion in the third direction.

6. The image forming apparatus according to claim 2, wherein the contact portion biases the biased portion upward.

7. The image forming apparatus according to claim 2, wherein the biasing member includes a compression spring.

8. The image forming apparatus according to claim 2, wherein the first biasing portion and the second biasing portion are positioned on the opposite side of the belt with respect to the rotational axis of the photosensitive drum.

9. The image forming apparatus according to claim 2, wherein the body casing includes a positioning member, the positioning member has a plate shape which is formed of metal and extends in the third direction, and the positioning member has recess portions, each of which is configured to receive an end portion, in the first direction, of a respective process cartridge, and wherein when the process cartridge is attached to the image forming apparatus, the positioning member is configured to contact the photosensitive drum.

10. The image forming apparatus according to claim 9, wherein each of the plurality of process cartridges includes an urging member disposed on each of the first sidewall and the second sidewall, and the body casing includes an urged portion configured to be urged vertically by the urging member.

11. The image forming apparatus according to claim 10, wherein when the process cartridge is attached to the image forming apparatus, the urged portion is configured to contact the urging member to allow the positioning member to position the photosensitive drum.

12. The image forming apparatus according to claim 10, wherein the urging member urges the urged portion downward.

13. The image forming apparatus according to claim 10, wherein the belt unit includes the belt and the urged portion, and the belt unit is disposed so as to face the photosensitive drum in the third direction.

14. The image forming apparatus according to claim 1, wherein the belt is disposed so as to face the photosensitive drum in a third direction perpendicular to the first direction and the second direction.

15. The image forming apparatus according to claim 1, wherein the belt is positioned above the process cartridge when the process cartridge is attached to the image forming apparatus.

16. The image forming apparatus according to claim 1, wherein the drawer positioned below the belt.

17. The image forming apparatus according to claim 1, wherein each of the plurality of process cartridges is configured to be detachably attached to the image forming apparatus in a third direction perpendicular to the first direction and the second direction.

* * * * *